(12) United States Patent
Hosseini et al.

(10) Patent No.: US 11,277,860 B2
(45) Date of Patent: Mar. 15, 2022

(54) RATE-MATCHING BEHAVIOR FOR OVERLAPPING RESOURCE BLOCK (RB) SETS

(71) Applicant: QUALCOMM Incorporated, San Diego, CA (US)

(72) Inventors: Seyedkianoush Hosseini, San Diego, CA (US); Sanam Sadr, Boulder, CO (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/403,371

(22) Filed: May 3, 2019

(65) Prior Publication Data

US 2019/0349977 A1 Nov. 14, 2019

Related U.S. Application Data

(60) Provisional application No. 62/668,794, filed on May 8, 2018.

(51) Int. Cl.
*H04W 72/12* (2009.01)
*H04W 76/27* (2018.01)
*H04W 72/04* (2009.01)

(52) U.S. Cl.
CPC ... *H04W 72/1289* (2013.01); *H04W 72/0446* (2013.01); *H04W 72/1226* (2013.01); *H04W 76/27* (2018.02)

(58) Field of Classification Search
CPC .................................................. H04W 72/1289
See application file for complete search history.

(56) References Cited

U.S. PATENT DOCUMENTS

2017/0318575 A1* 11/2017 Park .................. H04W 72/0446
2018/0227889 A1* 8/2018 Yang ..................... H04L 5/0091
(Continued)

OTHER PUBLICATIONS

"Offline input to sTTI session v2", 3GPP Draft; R1-1721218 Offline Input From STTI Session, 3RD Generation Partnership Project (3GPP), Mobile Competence Centre, 650, Route Des Lucioles ; F-06921 Sophia-Antipolis Cedex ; France, vol. RAN WG1, No. Reno, USA; Nov. 27-Dec. 1, 2017, Dec. 4, 2017 (Dec. 4, 2017), XP051370681, 17 Pages, Retrieved from the Internet: URL:http://www.3gpp.org/ftp/tsg%5Fran/WG1%5FRL1/TSGR1%5F91/Docs/ [retrieved on Dec. 4, 2017].

(Continued)

*Primary Examiner* — John D Blanton
(74) *Attorney, Agent, or Firm* — Qualcomm Incorporated

(57) ABSTRACT

Aspects of the present disclosure provide a mechanism for rate-matching between overlapping resource block (RB) sets within a transmission time interval (TTI). A physical downlink control channel (PDCCH) carrying downlink control information (DCI) including a downlink assignment for scheduling a physical downlink shared channel (PDSCH) may be received by a user equipment (UE) within the TTI. In some examples, the DCI may be included within control channel elements (CCEs) located within shared resource elements between two overlapping RB sets. If the CCEs forming a decoding candidate over which the DCI may be detected are entirely contained within the shared resource elements, the UE may perform rate-matching around the two overlapping RB sets.

30 Claims, 18 Drawing Sheets

(56) References Cited

U.S. PATENT DOCUMENTS

| | | | | |
|---|---|---|---|---|
| 2019/0150125 A1* | 5/2019 | Bagheri | ............... | H04L 69/324 370/336 |
| 2019/0297602 A1* | 9/2019 | You | ..................... | H04W 72/042 |
| 2019/0342866 A1* | 11/2019 | Kwak | ................... | H04L 5/0053 |
| 2020/0067676 A1* | 2/2020 | Yi | ....................... | H04W 72/042 |

OTHER PUBLICATIONS

Ericsson: "RAN1 decisions for WI Shortened TTI and processing time for LTE (LTE_sTTIandPT)—per topic", 3GPP Draft; R1-1803174, RAN1 Decisions for LTE STTIANDPT—Per Topic (Revision of R1-1721313), 3RD Generation Partnership Project (3GPP), Mobile Competence Centre, 650, Route Des Lucioles ; F-06921 S, vol. RAN WG1, No. Athens, Greece; Feb. 26-Mar. 2, 2018, Mar. 6, 2018 (Mar. 6, 2018), XP051412726, 8 pages, Retrieved from the Internet: URL:http://www.3gpp.org/ftp/tsg%5Fran/WG1%5FRL1/TSGR1%5F92/Docs/ [retrieved on Mar.6, 2018].

Huawei et al., "sPDCCH Multiplexing with Data", 3GPP Draft; R1-1719450, 3RD Generation Partnership Project (3GPP), Mobile Competence Centre, 650, Route Des Lucioles, F-06921 Sophia-Antipolis Cedex, France, vol. RAN WG1, No. Reno, USA; Nov. 27-Dec. 1, 2017, Nov. 17, 2017 (Nov. 17, 2017), XP051369151, 6 Pages, Retrieved from the Internet: URL:http://www.3gpp.org/ftp/tsg%5Fran/WG1%5FRL1/TSGR1%5F91/Docs/ [retrieved on Nov. 17, 2017], sections 1, 3, 3.2, 4.

International Search Report and Written Opinion—PCT/US2019/030842—ISA/EPO—dated Jul. 29, 2019.

Mediatek Inc: "Clarification for sPDSCH rate matching behavior with two SPDCCH PRB set", 3GPP Draft; R1-1805087-Mediatek-Clarification for SPDSCH Rate Matching Behavior With Two SPDCCH PRB Set, 3RD Generation Partnership Project (3GPP), Mobile Competence Centre, 650, Route Des Lucioles, vol. RAN WG1, No. Sanya, China; Apr. 16-20, 2018, Apr. 15, 2018 (Apr. 15, 2018), XP051427347, 4 Pages, Retrieved from the Internet: URL:http://www.3gpp.org/ftp/Meetings%5F3GPP%5Fsync/RAN1/Docs/ [retrieved on Apr. 15, 2018].

3GPP, "3rd Generation Partnership Project, Technical Specification Group Radio Access Network, NR, Physical Layer Procedures Data (Release 15)", 3GPP TS 38.214 V15.1.0 (Mar. 2018), Mar. 2018, 1 page, full copy of Section 5.1.4.2, PDSCH Resource Mapping with RE Level Granularity.

* cited by examiner

RATE-MATCHING BEHAVIOR FOR OVERLAPPING RESOURCE BLOCK (RB) SETS

PRIORITY CLAIM

This application claims priority to and the benefit of Provisional Patent Application No. 62/668,794, entitled "Rate-Matching Behavior for Overlapping Resource Block (RB) Sets," filed in the U.S. Patent and Trademark Office on May 8, 2018, the entire contents of which are incorporated herein by reference as if fully set forth below in their entirety and for all applicable purposes.

TECHNICAL FIELD

The technology discussed below relates generally to wireless communication systems, and more particularly, to rate-matching in wireless communication systems.

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH). The downlink assignments and/or uplink grants may indicate resources within a subframe or slot reserved for the transmission of user data traffic. For example, such traffic may be carried on a physical downlink shared channel (PDSCH) within the resources reserved for a downlink transmission or a physical uplink shared channel (PUSCH) within the resources reserved for an uplink transmission, where the PDCCH and PUSCH do not collide.

Resources may be allocated to a UE in units of resource blocks (RBs), where each RB includes a suitable number of consecutive subcarriers in the frequency domain and a suitable number of consecutive symbols (e.g., orthogonal frequency division multiplexing (OFDM) symbols) in the time domain. In an example, an RB may include 12 subcarriers and one or more symbols. In some examples, a PDCCH may be transmitted to a UE over an RB set, which refers to a collection of RBs over which a UE's search space for the PDCCH is defined.

For a PDSCH or PUSCH, the traffic may be transmitted in blocks of information called transport blocks. The transport block size (TBS), which may correspond to a number of bits of information, may be a controlled parameter, based on the modulation and coding scheme (MCS) and the number of RB s allocated for the PDSCH. In some examples, rate-matching may be performed on the TB to match the number of bits in the TB after encoding to the number of bits that can be transmitted in the allocated resources.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to mechanisms for rate-matching between overlapping resource block (RB) sets within a transmission time interval (TTI). A physical downlink control channel (PDCCH) carrying downlink control information (DCI) including a downlink assignment for scheduling a physical downlink shared channel (PDSCH) may be received by a user equipment (UE) within the TTI. In some examples, the DCI may be included within control channel elements (CCEs) located within shared resource elements between two overlapping RB sets. If the CCEs forming a decoding candidate over which the DCI may be detected are entirely contained within the shared resources between each of two overlapping RB sets, the UE may assume that the decoding candidate is within both RB sets and follow the rate-matching behavior of each of the RB sets. In an example, the UE may perform rate-matching around the two overlapping RB sets.

In one example, a method of wireless communication at a scheduled entity, such as a UE, is disclosed. The method includes receiving a physical downlink control channel (PDCCH) within two overlapping resource block (RB) sets of a plurality of RB sets within a transmission time interval (TTI). Each of the plurality of RB sets includes a respective group of RBs, and each of the RBs comprising a plurality of resource elements. The PDCCH includes downlink control information (DCI) scheduling a physical downlink shared channel (PDSCH). The method further includes identifying control channel elements (CCEs) forming a decoding candidate over which the DCI is detected within the two overlapping RB sets, determining the CCEs are located within each of the two overlapping RB sets only when the CCEs are entirely contained within an overlap region including shared resource elements of the plurality of resource elements between each of the two overlapping RB sets, and performing rate-matching around each of the two overlapping RB sets for the PDSCH when the CCEs are determined to be located within each of the two overlapping RB sets.

Another example provides a scheduled entity in a wireless communication network. The scheduled entity includes a transceiver in wireless communication with a scheduling entity, a memory, and a processor communicatively coupled to the transceiver and the memory. The processor is configured to receive a physical downlink control channel (PDCCH) from the scheduling entity within two overlapping resource block (RB) sets of a plurality of RB sets within a transmission time interval (TTI) via the transceiver. Each of the plurality of RB sets includes a respective group of RBs, and each of the RBs comprising a plurality of resource elements. The PDCCH includes downlink control information (DCI) scheduling a physical downlink shared channel (PDSCH). The processor is further configured to identify control channel elements (CCEs) forming a decoding candidate over which the DCI is detected within the two overlapping RB sets, determine the CCEs are located within each of the two overlapping RB sets only when the CCEs are entirely contained within an overlap region including shared resource elements of the plurality of resource elements between each of the two overlapping RB sets, and perform rate-matching around each of the two overlapping RB sets for the PDSCH when the CCEs are determined to be located within each of the two overlapping RB sets.

Another example provides a method of wireless communication at a scheduling entity, such as a base station. The method includes scheduling two overlapping resource block (RB) sets of a plurality of RB sets within a transmission time interval (TTI) for transmission of a physical downlink control channel (PDCCH) including downlink control information (DCI) to a scheduled entity, such as a UE. Each of the plurality of RB sets includes a respective group of RBs, and each of the RBs includes a plurality of resource elements. The method further includes scheduling control channel elements (CCEs) forming a decoding candidate over which the DCI is detected within the two overlapping RB sets, determining the CCEs are located within each of the two overlapping RB sets only when the CCEs are entirely contained within an overlap region including shared resource elements of the plurality of resource elements between each of the two overlapping RB sets, performing rate-matching around each of the two overlapping RB sets for a physical downlink shared channel (PDSCH) scheduled by the DCI when the CCEs are determined to be located within each of the two overlapping RB sets, and transmitting the PDCCH and the PDSCH to the scheduled entity within the TTI.

Another method provides a scheduling entity in a wireless communication network. The scheduling entity includes a transceiver in wireless communication with a scheduled entity, a memory, and a processor communicatively coupled to the transceiver and the memory. The processor is configured to schedule two overlapping resource block (RB) sets of a plurality of RB sets within a transmission time interval (TTI) for transmission of a physical downlink control channel (PDCCH) including downlink control information (DCI) to the scheduled entity, such as a UE. Each of the plurality of RB sets includes a respective group of RBs, and each of the RBs includes a plurality of resource elements. The processor is further configured to schedule control channel elements (CCEs) forming a decoding candidate over which the DCI is detected within the two overlapping RB sets, determine the CCEs are located within each of the two overlapping RB sets only when the CCEs are entirely contained within an overlap region including shared resource elements of the plurality of resource elements between each of the two overlapping RB sets, perform rate-matching around each of the two overlapping RB sets for a physical downlink shared channel (PDSCH) scheduled by the DCI when the CCEs are determined to be located within each of the two overlapping RB sets, and transmit the PDCCH and the PDSCH to the scheduled entity within the TTI via the transceiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
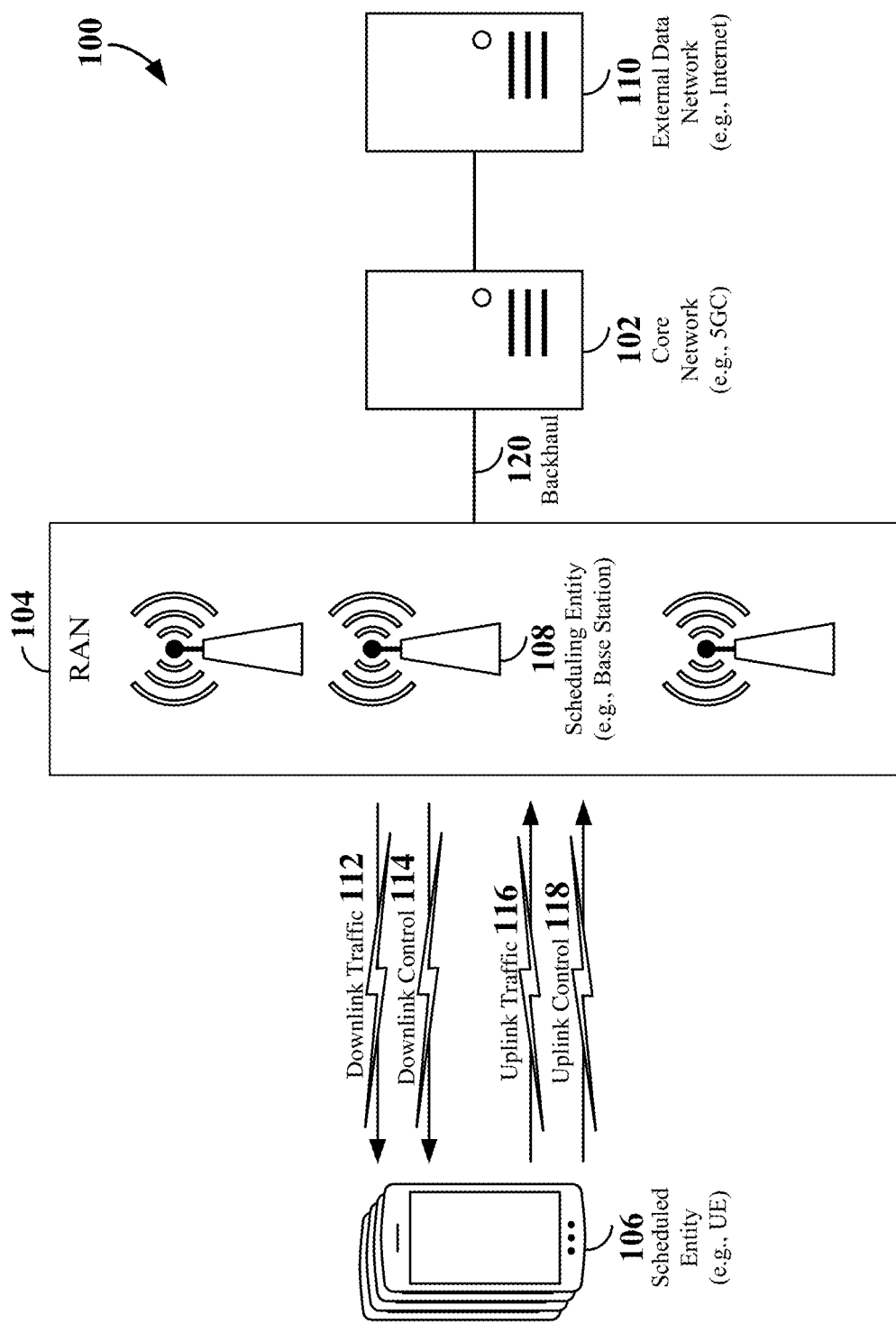
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below;

e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
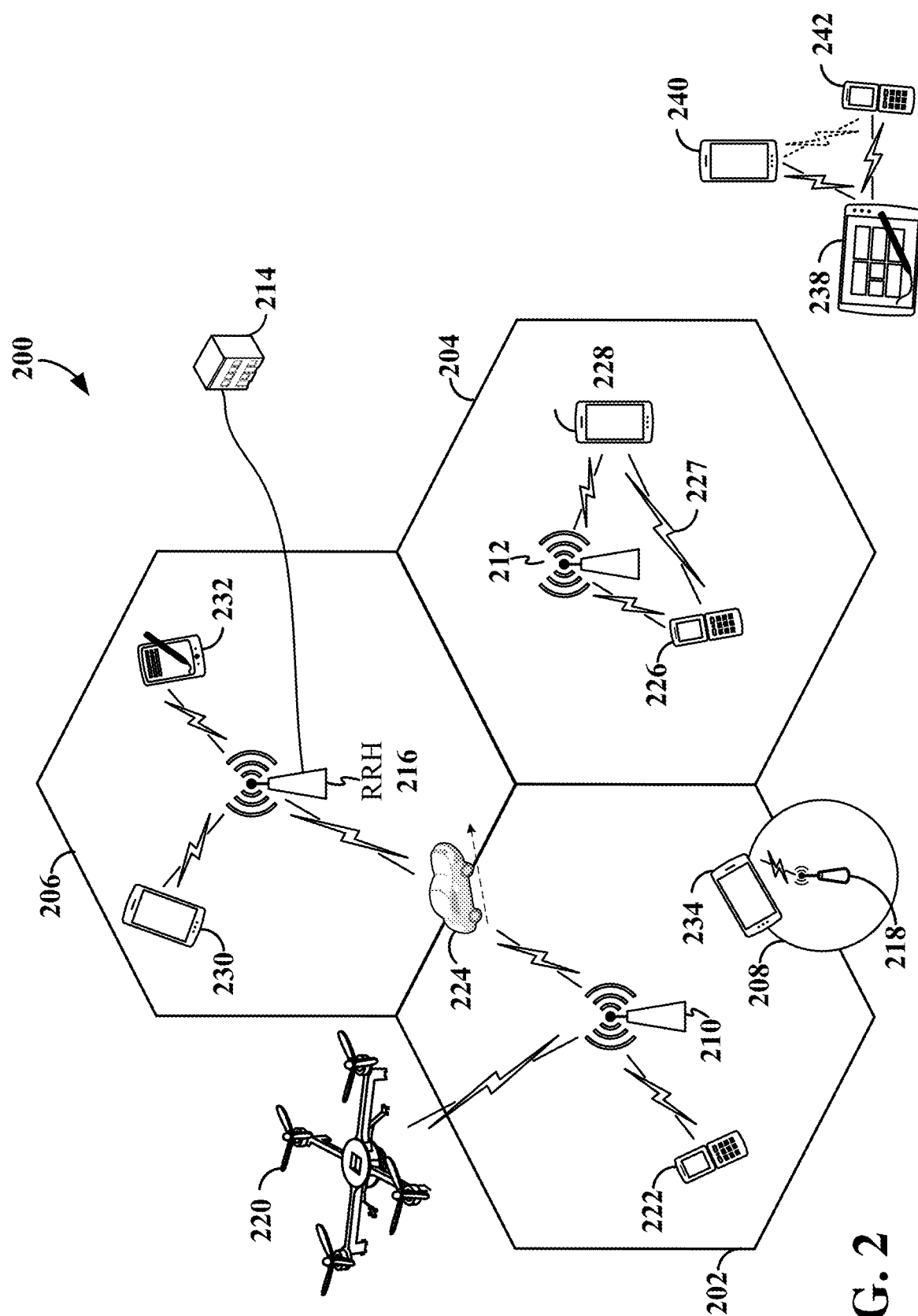
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
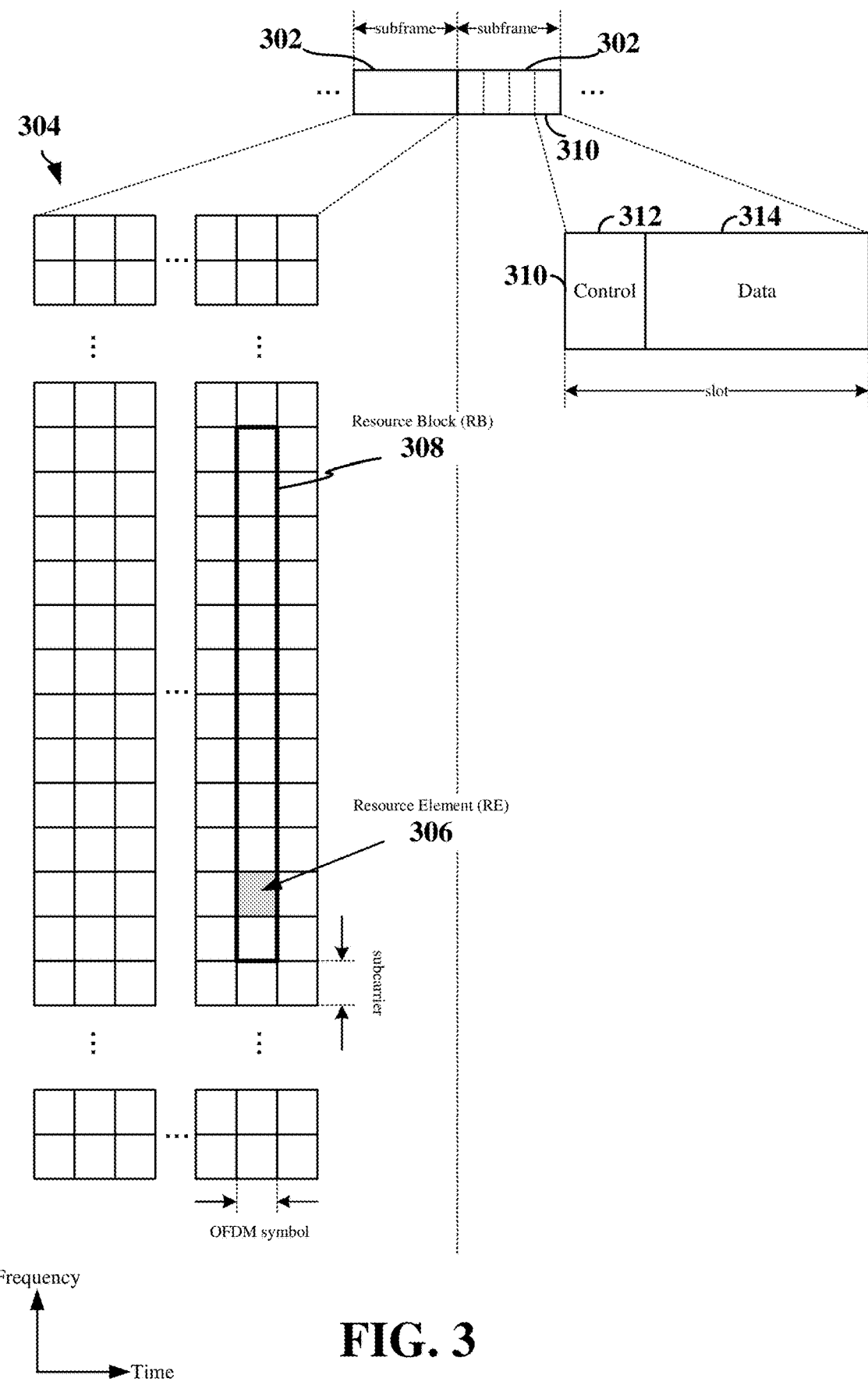
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The PDCCH is typically transmitted over an aggregation of contiguous control channel elements (CCEs) in the first N OFDM symbols of the subframe, slot, or mini-slot, where N is less than or equal to four. In some examples, one CCE includes nine continuous resource element groups (REGs), where each REG includes four resource elements (REs). Thus, one CCE may include thirty-six REs. In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, and 8 may be supported, corresponding to 1, 2, 4, or 8 contiguous CCEs, respectively.

The DCI within the PDCCH provides downlink resource assignments and/or uplink resource grants for one or more UEs. Multiple PDCCHs may be transmitted each subframe, slot, or mini-slot, and each PDCCH may carry UE-specific DCI or common DCI (e.g., control information broadcast to a group of UEs). Each DCI may further include a cyclic redundancy check (CRC) bit that is scrambled with the UE ID (e.g., a specific UE ID or a group UE ID) to allow the UE to determine the type of control information sent in the PDCCH.

Since the UE is unaware of the particular aggregation level of the PDCCH or whether multiple PDCCHs may exist for the UE in the subframe, slot, or mini-slot, the UE may perform blind decoding of various decoding candidates within the first N control OFDM symbols. Each decoding candidate includes a collection of one or more consecutive CCEs based on an assumed DCI length (e.g., PDCCH aggregation level). To limit the number of blind decodes, a UE-specific search space and a common search space may be defined. The search spaces, also known as control regions, limit the number of blind decodes that the UE performs for each PDCCH format combination. The common search space consists of CCEs used for sending control information that is common to a group of UEs. Thus, the common search space is monitored by all UEs in a cell and is typically static between subframes, slots, or mini-slots. In some examples, the maximum number of CCEs within the common search space may be sixteen. There are typically only two PDCCH aggregation levels supported in the common search space: 8 and 4. Therefore, within the first 16 CCEs, the UE may perform blind decoding of decoding candidates at aggregation level 8 (which results in two decodes in the common search space) and at aggregation level 4 (which results in four decodes in the common search space). If the UE successfully decodes a PDCCH in the common search space, those CCEs may be omitted from any overlapping UE-specific search space.

The UE-specific search space consists of CCEs used for sending control information for particular UEs. The starting point (offset or index) of a UE-specific search space may be different for each UE and each UE may have multiple UE-specific search spaces (e.g., one for each aggregation level). The maximum number of CCEs within a particular UE-specific search space for a specific UE may be variable dependent upon the PDCCH aggregation level. For example, the PDCCH aggregation level of 1 has a UE-specific search space of 6 CCEs, the PDCCH aggregation level of 2 has a UE-specific search space of 12 CCEs, the PDCCH aggregation level of 4 has a UE-specific search space of 8 CCEs and the PDCCH aggregation level of 8 has a UE-specific search space of 16 CCEs. Thus, for each of the PDCCH aggregation levels of 1 or 2, there are 6 PDCCH decoding candidates within the UE-specific search space. Similarly, for each of the PDCCH aggregation levels of 4 or 8, there are 2 PDCCH decoding candidates within the UE-specific search space. For example, for the PDCCH aggregation level of 1 with a UE-specific search space of 6 CCEs, each decoding candidate includes one of the CCEs within the UE-specific search space. As another example, for the PDCCH aggregation level of 4 with a UE-specific search space of 8, each decoding candidate includes 4 CCEs within the UE-specific search space (e.g., a first decoding candidate may include CCEs 0-3 and a second decoding candidate may include CCEs 4-7). The UE may perform blind decoding over all aggregation levels and corresponding UE-specific search spaces to determine whether at least one valid DCI exists for the UE within the UE-specific search space(s).

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
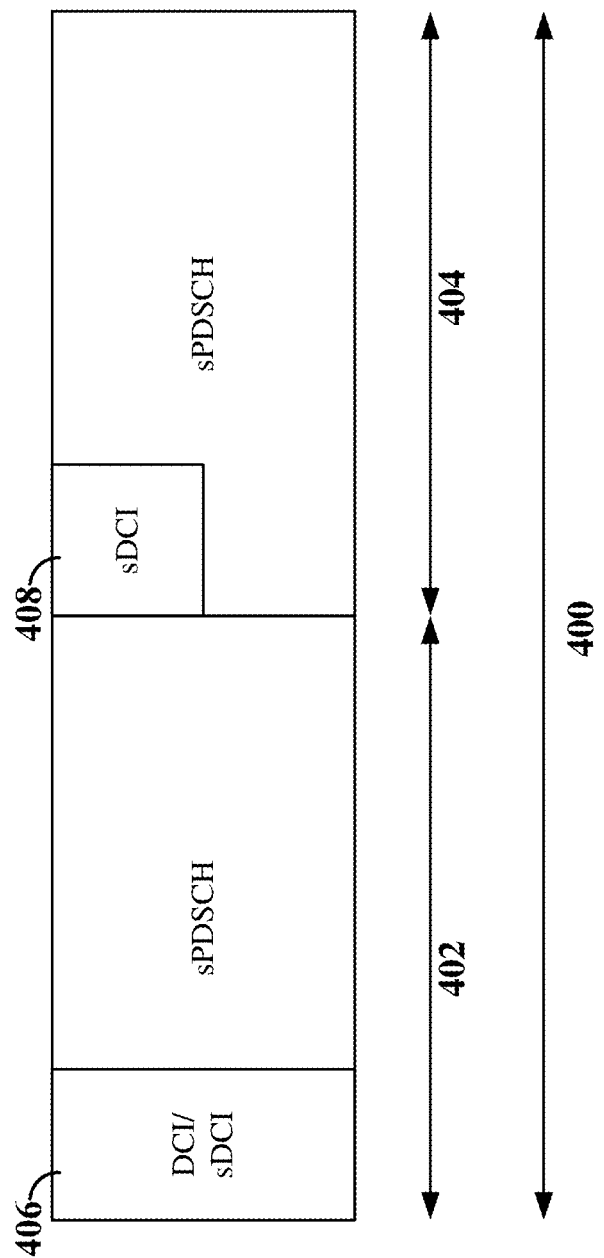
FIG. 4 is a diagram illustrating an example of a shortened transmission time intervals (sTTIs) within a subframe.

In order to support ultra-reliable low-latency communication (URLLC), shortened TTIs (sTTIs), also referred to as short TTIs, having a length of seven or fewer OFDM symbols have been introduced in Release 14 and 15 of LTE standards. An example of sTTIs is shown in FIG. 4. In the example shown in FIG. 4 a subframe 400 containing fourteen OFDM symbols is shown divided into two slots 402 and 404. Each slot 402 and 404 corresponds to a sTTI and includes seven OFDM symbols. In some examples, each sTTI 402 and 404 may be scheduled independently. Thus, each sTTI may include a scheduling PDCCH that includes downlink control information (DCI) containing a downlink assignment for a shortened PDSCH (sPDSCH) transmitted within the sTTI. As such, each sTTI may be entirely self-contained.

In the example shown in FIG. 4, the respective scheduling PDCCH for each sTTI may be a shortened PDCCH (sPDCCH) and the respective DCI within each of the shortened PDCCH may be a shortened DCI (sDCI). The sPDDCH refers to the channel that carries the DCI for an sTTI. In addition, sDCI refers to a DCI utilized in a sTTI operation. In some examples, the DCI formats defined for sTTI operations are different than those defined for legacy LTE subframes. It should further be noted that sPDSCH is the same as PDSCH, but refers to a sTTI operation.

In the first sTTI 402, the sDCI may be located within a control region 406 of the subframe 400 that contains both sDCI for the first sTTI 402 and DCI for the subframe 400. The control region 406 of the subframe may include the total system bandwidth in the frequency domain and N OFDM symbols in the time domain, where N is less than or equal to four. In the second sTTI 404, the sDCI may be located within a shortened control region 408 of the second sTTI 404. The shortened control region 408 may include, for example, less than the total system bandwidth in the frequency domain and/or fewer OFDM symbols than the subframe control region 406 in the time domain. In some examples, the size of the control region 408 of the second sTTI 404 may be defined via radio resource control (RRC) signaling.

Figure 5:
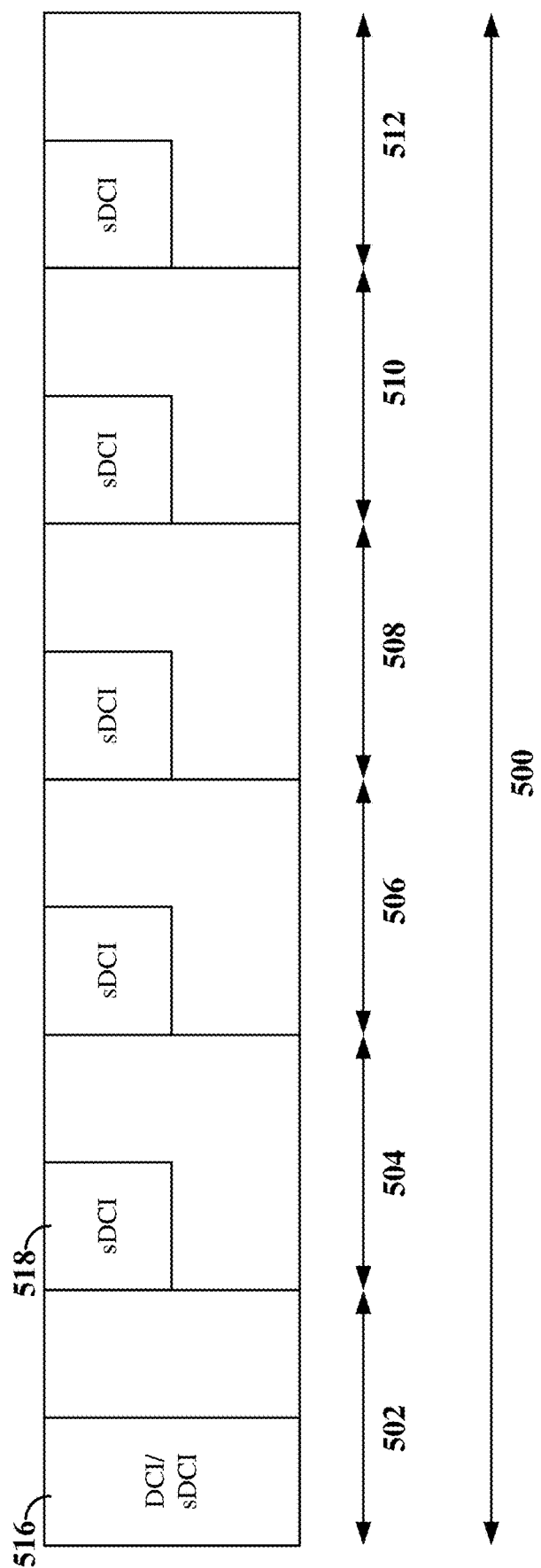
FIG. 5 is a diagram illustrating another example of sTTIs within a subframe.

FIG. 5 illustrates another example of sTTIs. In the example shown in FIG. 5, a subframe 500 containing fourteen OFDM symbols is shown divided into six slots 502, 504, 506, 508, 510, and 512. Each slot 502-512 corresponds to a sTTI and includes two or three OFDM symbols. In some examples, each sTTI 402 and 404 may be scheduled independently. Thus, as in FIG. 4, the first sTTI 502 may include both sDCI for the first sTTI 502 and DCI for the subframe 500 within a control region 516 of the subframe 500. In each of the subsequent sTTIs 504-512, the sDCI may be located within a shortened control region 518 of the respective sTTI.

In some examples, within a sTTI, a control region within which a sDCI may be transmitted may be defined as a resource block (RB) set. In this example, the term RB set refers to a group of RBs (e.g., one or more RBs) over which a UE's search space is defined. As indicated above, each RB includes a plurality of resource elements (REs). Different RB set formats may be configured for a UE for different types of reference signals, including but not limited to a demodulation reference signal (DMRS) or a control reference signal (CRS). An RB set for which channel estimation is performed using a control reference signal (CRS) may include one or two OFDM symbols in the time domain and one or more shortened control channel elements (sCCEs) in the frequency domain. As used herein, the term sCCE refers to a minimum transmission unit for the sPDCCH. For CRS-based RB sets, one sCCE includes four shortened resource element groups (sREGs), where each sREG includes one RB (e.g., twelve resource elements). Thus, one sCCE for CRS-based RB sets may include forty-eight REs.

In addition, a DMRS-based RB set may include two OFDM symbols in the time domain and one or more sCCEs in the frequency domain. For DMRS-based RS sets, one sCCE includes either four sREGs in a two-symbol sTTI or six sREGs in a three-symbol sTTI. Thus, one sCCE for DMRS-based RB sets may include either forty-eight REs or seventy-two REs.

In some examples, the sPDCCH may be constructed from a variable number of sCCEs, depending on the sPDCCH format (or aggregation level). Each sPDCCH format (or aggregation level) supports a different sDCI length. In some examples, sPDCCH aggregation levels of 1, 2, 4, and 8 may be supported, corresponding to 1, 2, 4, or 8 contiguous sCCEs, respectively.

In Release 15 of LTE, each UE may be configured with at most two RB sets within a sTTI. The RB sets may be continuous, discontinuous, or overlapping. The RB sets may be semi-statically defined based on the subframe type and configured for the UE via RRC signaling.

The sPDCCH for a UE may be transmitted over one or both of the RB sets configured for the UE. Each RB set may further be configured with a rate-matching mode, which defines the sPDSCH mapping allowed in the RB set. The rate-matching mode indicates whether the sPDSCH may be scheduled within the RB set, and therefore, whether RBs within the RB set may be considered for rate-matching of the sPDSCH. As used herein, the term rate-matching refers to a process of matching the number of bits in a transport block (TB) containing the user data traffic transmitted over the PDSCH to the number of bits that can be transmitted in the resources scheduled for the PDSCH. In some examples, rate-matching may be performed after encoding of one or more code blocks of the TB, and may include interleaving, bit collection, bit selection, and/or pruning. At the UE, rate de-matching may be performed to extract the encoded code blocks. However, for simplicity, the term, rate-matching, may be used herein to refer to either rate-matching performed at the base station or rate de-matching performed at the UE.

In a first mode (Mode 1), the base station/UE may rate-match around the sDCI included in the RB set. Thus, in Mode 1, a PDSCH may be mapped and rate-matched within the same RB set as the sDCI, excluding those resource elements that contain the sDCI. In a second mode (Mode 2), the base station/UE may rate-match around the entire RB set. Thus, in Mode 2, a sPDSCH may not be mapped within an RB set (control region) configured for the UE, regardless of whether a sDCI for the UE is included in the RB set. In a third mode (Mode 3), the base station/UE may rate-match around the entire RB set if sDCI scheduling a sPDSCH is scheduled/detected in the RB set. Thus, in Mode 3, a sPDSCH may be mapped and rate-matched in a RB set only if sDCI is not included in the RB set. In a fourth mode (Mode 4), if sDCI scheduling a sPDSCH is not scheduled/detected in a RB set, the base station/UE may rate-match around the entire RB set. Thus, in Mode 4, a sPDSCH may not be mapped within an RB set (control region) configured for the UE when a sDCI for the UE is not included in the RB set. Otherwise, in Mode 4, if sDCI scheduling a sPDSCH is scheduled/detected in the RB set, the base station/UE may rate-match around the sDCI. Thus, in Mode 4, if sDCI is included in an RB set, a PDSCH may be mapped and rate-matched within the same RB set as the sDCI, excluding those resource elements that contain the sDCI.

Figure 6:
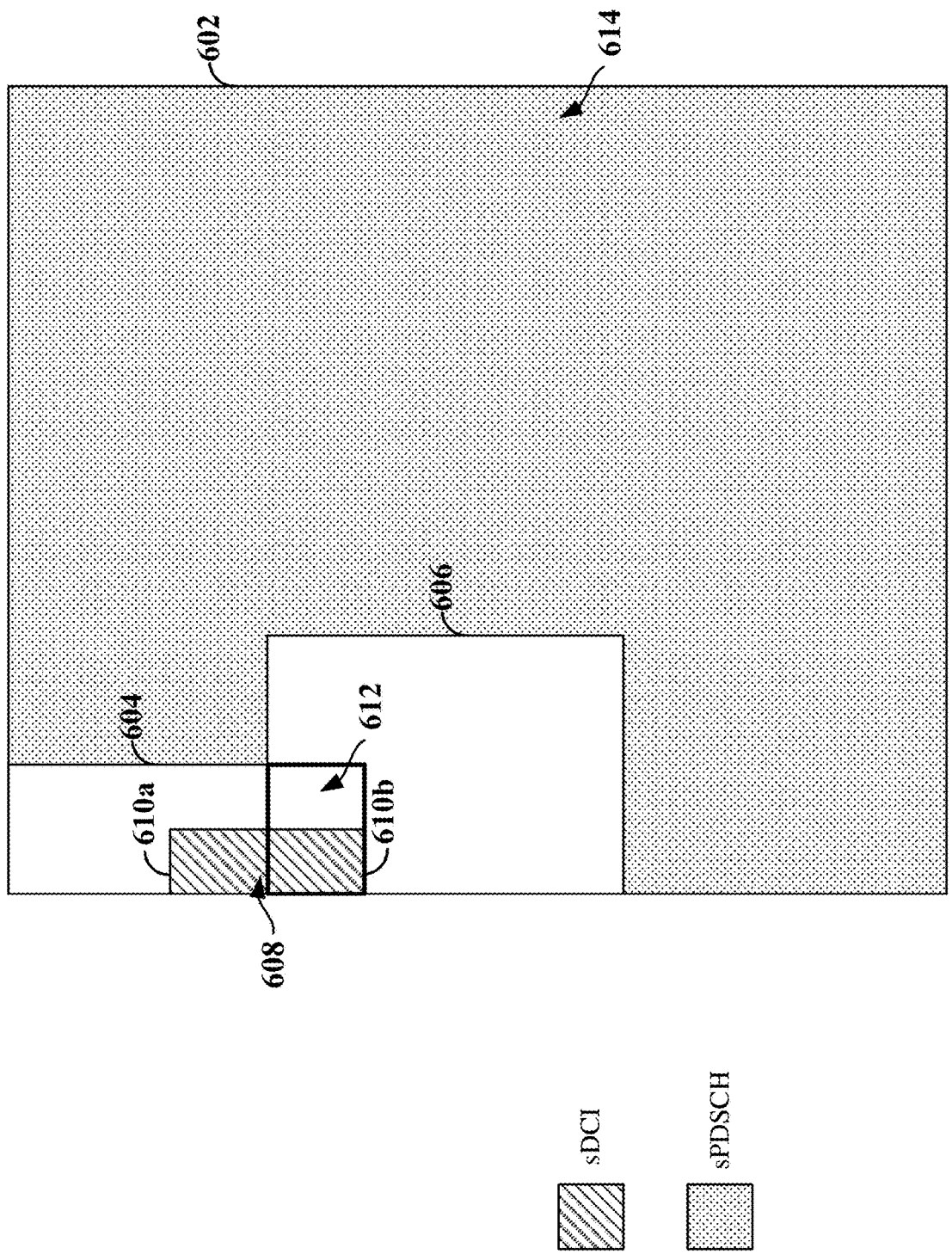
FIG. 6 is a diagram illustrating an example of scheduling shortened downlink control information (sDCI) and a shortened physical downlink shared channel (sPDSCH) within a sTTI including overlapping resource block (RB) sets.

In examples where the UE is configured with two overlapping RB sets, the sDCI may be detected on a decoding candidate for which some of the sCCEs are shared across the two overlapping RB sets. FIG. 6 illustrates an example of overlapping RB sets. In the example shown in FIG. 6, two RB sets 604 and 606 are illustrated within a sTTI 602. A portion of RB set 604 overlaps RB set 606, such that one or more sCCEs are shared across the two RB sets 604 and 606 within an overlap region 612. In some examples, a sPDCCH carrying sDCI 608 may be transmitted on at least some of the sCCEs in the overlap region 612. In the example shown in FIG. 6, an aggregation level of 2 is utilized such that the sDCI 608 may be detected on a decoding candidate including two sCCEs 610a and 610b. One of the sCCEs (e.g., sCCE 610a) is entirely located within RB set 604, whereas the other sCCE (e.g., sCCE 610b) is located within the overlap region 612 between RB set 604 and RB set 606.

If both RB sets 604 and 606 are configured with Mode 3, the UE should rate-match around both of the RB sets 604 and 606 (e.g., the UE may determine that a sPDSCH 614 may not be transmitted within RB set 604 or RB set 606). This is due to the fact that the sPDCCH (e.g., sDCI 608) is located within each of the RB sets 604 and 606. However, such a configuration unnecessarily wastes resources within the RB sets 604 and 606.

Therefore, in various aspects of the present disclosure, the sPDCCH carrying sDCI 608 scheduling a sPDSCH 614 may be considered to be located within each of two overlapping RB sets 604 and 606 only when the sCCEs forming a decoding candidate over which the sDCI is detected are entirely contained within the overlap region 612. Otherwise, if at least one of the sCCEs forming the decoding candidate is located within only one of the RB sets, the sDCI is considered to be located in only that one RB set. For example, as shown in FIG. 6, since the sDCI 608 may be detected on a sCCE 610a that is located only within RB set 604, the sDCI 608 may be considered to be located within only RB set 604.

Figure 7:
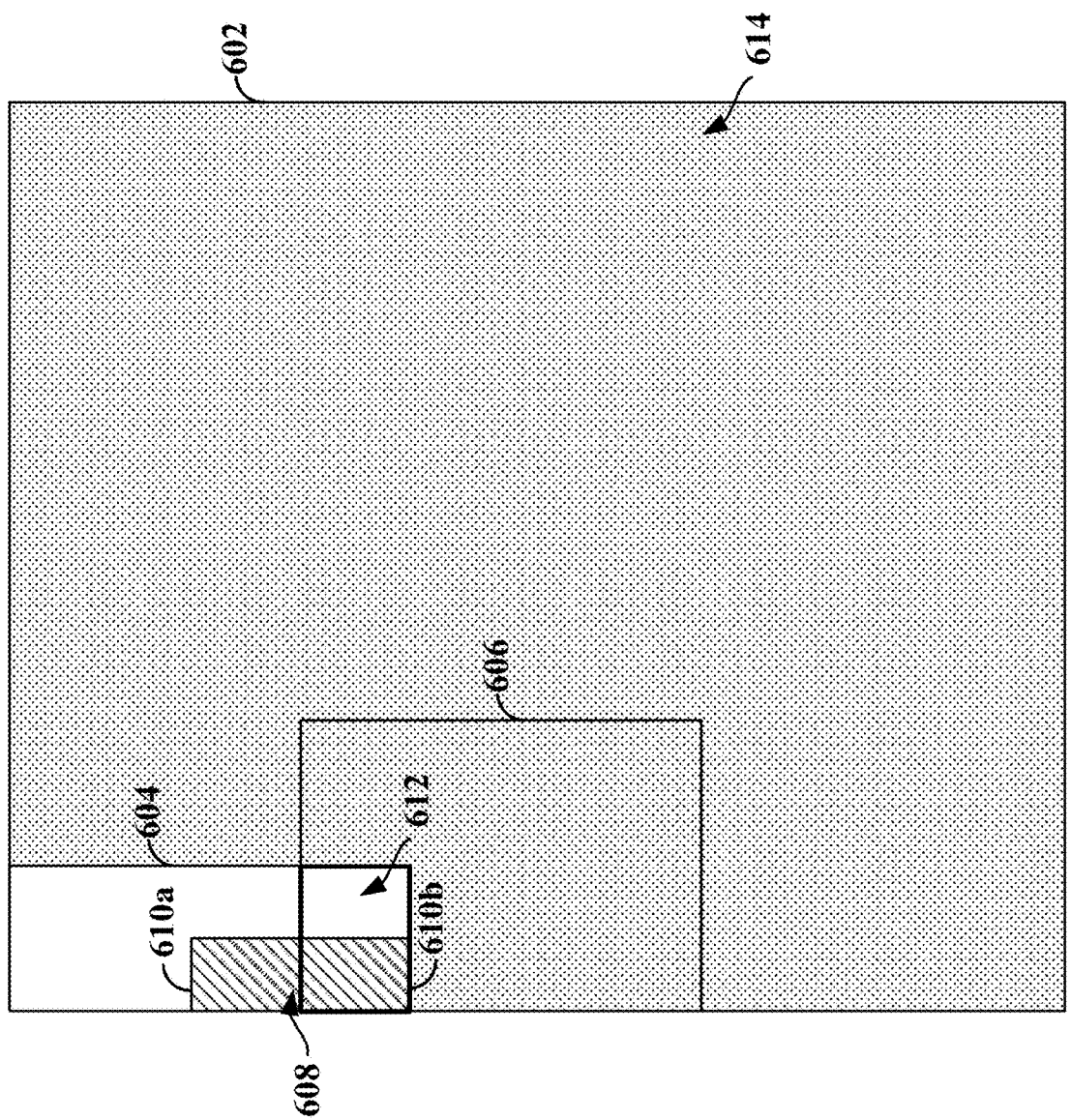
FIG. 7 is a diagram illustrating another example of scheduling sDCI and a sPDSCH within a sTTI including overlapping RB sets.
Figure 8:
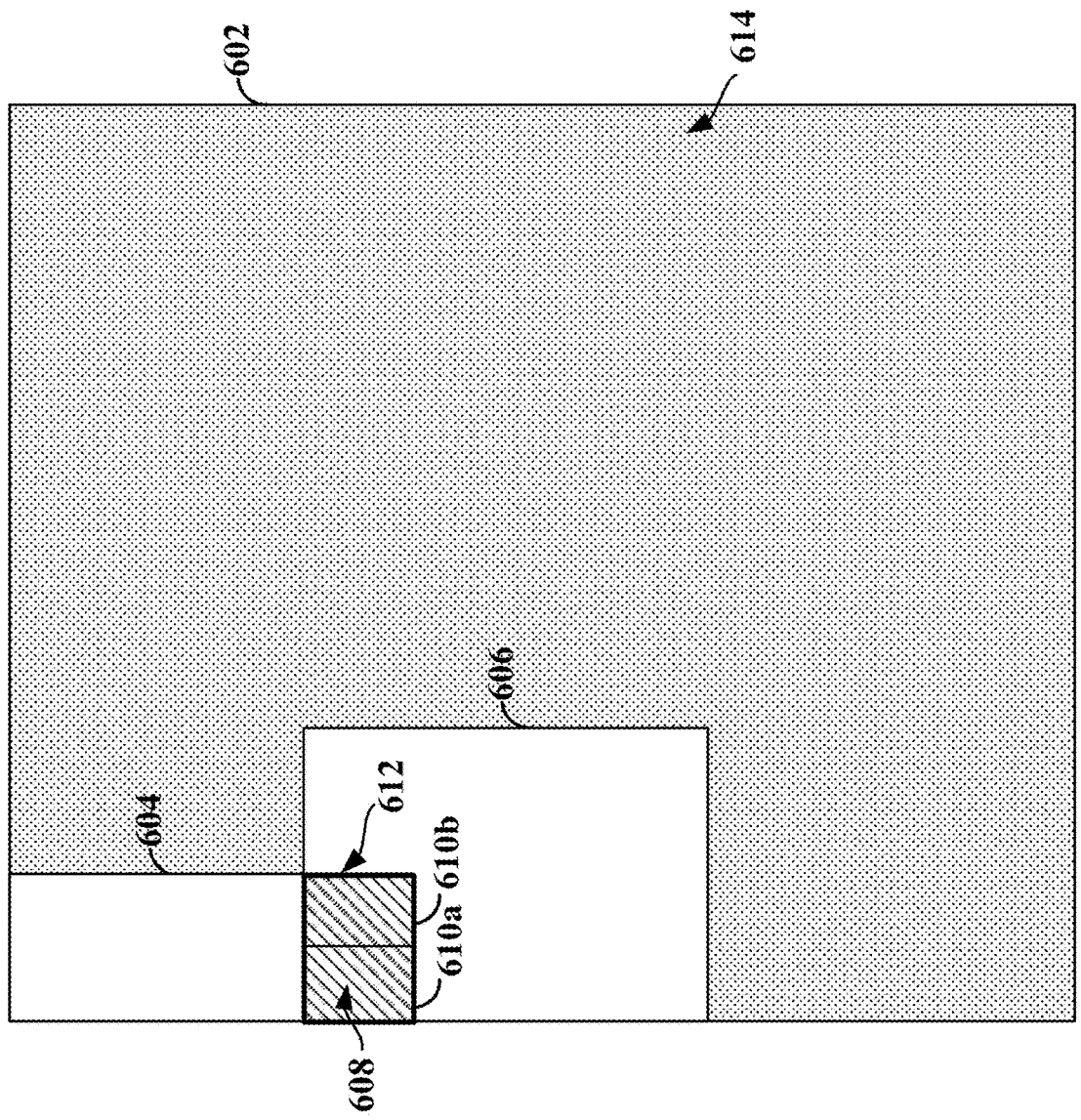
FIG. 8 is a diagram illustrating another example of scheduling sDCI and a sPDSCH within a sTTI including overlapping resource block (RB) sets.

As a result, as shown in FIG. 7, the UE may rate-match around the overlap region 612 in RB set 606, which enables a sPDSCH 614 to be scheduled and rate-matched within a remaining portion of RB set 606 outside of the overlap region 612. However, as shown in FIG. 8, if the all of the sCCEs 610a and 610b forming the decoding candidate of the sDCI 608 are contained within the overlap region 612, the sPDSCH 614 may not be scheduled within either sCCE 602 or sCCE 604.

Figure 9:
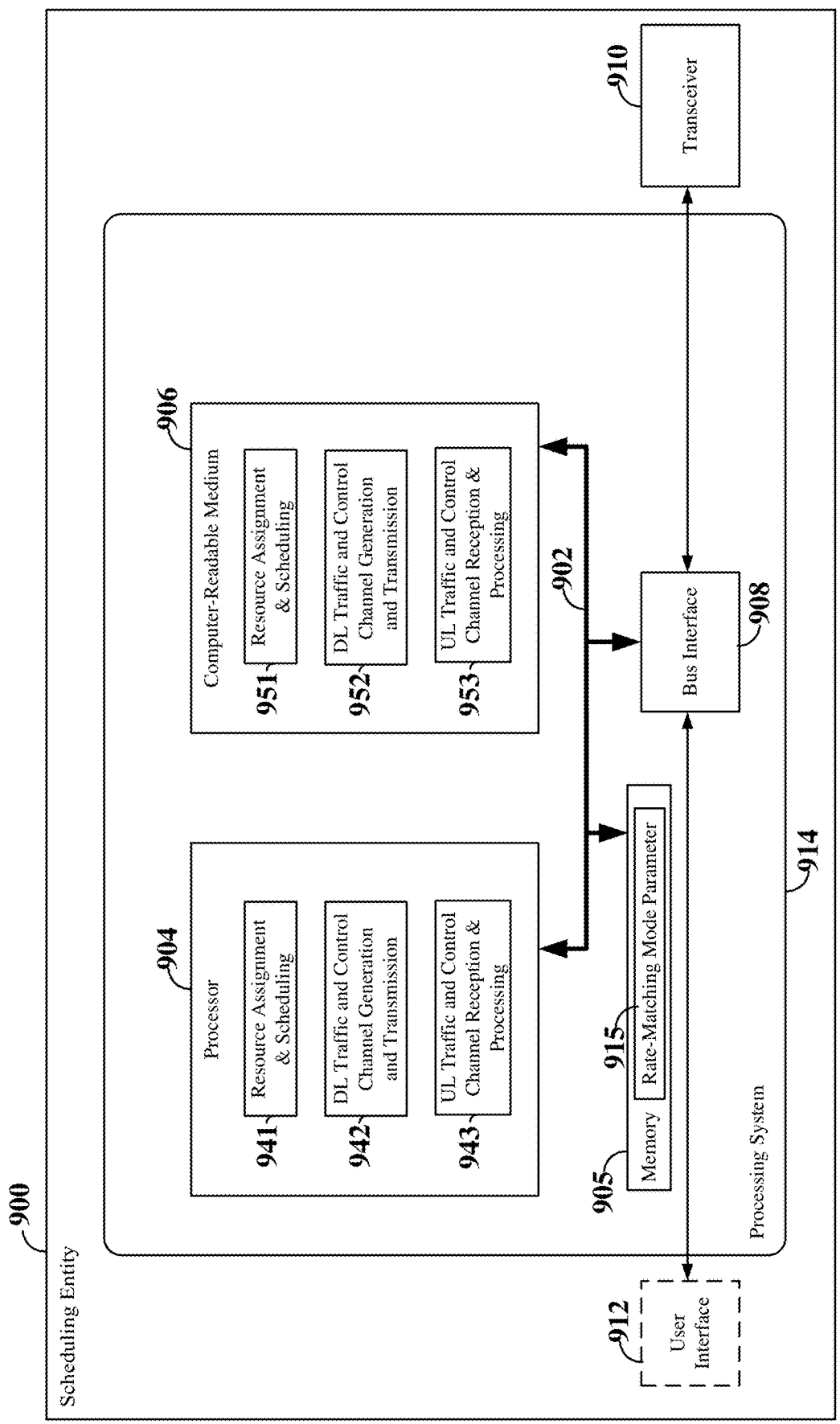
FIG. 9 is a block diagram illustrating an example of a hardware implementation for a scheduling entity employing a processing system.

FIG. 9 is a conceptual diagram illustrating an example of a hardware implementation for an exemplary scheduling entity 900 employing a processing system 914. For example, the scheduling entity 900 may be a base station as illustrated in any one or more of FIGS. 1 and 2. In another example, the scheduling entity 900 may be a user equipment (UE) as illustrated in any one or more of FIGS. 1 and 2.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes described below. The processor 904 may in some instances be implemented via a baseband or modem chip and in other implementations, the processor 904 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, speaker, microphone, joystick) may also be provided. Of course, such a user interface 912 is optional, and may be omitted in some examples, such as a base station.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. In some examples, the computer-readable medium 906 may be part of the memory 905. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include resource assignment and scheduling circuitry 941, configured to generate, schedule, and modify a resource assignment or grant of time-frequency resources (e.g., a set of one or more resource elements). For example, the resource assignment and scheduling circuitry 941 may schedule time-frequency resources within a plurality of time division duplex (TDD) and/or frequency division duplex (FDD) subframes, slots, and/or mini-slots or sTTIs to carry user data traffic and/or control information to and/or from multiple UEs (scheduled entities).

In some examples, the resource assignment and scheduling circuitry 941 may be configured to schedule two overlapping RB sets for a UE (scheduled entity) served by the scheduling entity for the transmission of a PDCCH (e.g., sPDCCH) including DCI (e.g., sDCI) scheduling a PDSCH (e.g., sPDSCH) to the scheduled entity and configure a rate-matching mode for the overlapping RB sets. In some examples, the rate-matching mode may be Mode 3, which indicates that rate-matching is performed around at least one RB set of the overlapping RB sets when the sDCI scheduling the sPDSCH is detected in the at least one RB set.

The resource assignment and scheduling circuitry 941 may further be configured to schedule CCEs (e.g., sCCEs) forming a decoding candidate over which the sDCI scheduling the sPDSCH may be detected, where at least one of the sCCEs is within an overlap region between the RB sets. If all of the sCCEs are entirely contained within the overlap region, the resource assignment and scheduling circuitry 941 may be configured to determine that the sPDCCH carrying the sDCI is located in both RB sets for rate-matching purposes. As a result, the resource assignment and scheduling circuitry 941 may not schedule the sPDSCH within either of the RB sets when the RB sets are configured with rate-matching Mode 3. Thus, the resource assignment and scheduling circuitry 941 may schedule the sPDSCH within a collection of RBs outside of the two overlapping RB sets within which the sPDCCH is scheduled.

However, if at least one of the sCCEs is located within only a single RB set (e.g., not within the overlap region), while the remaining sCCEs are located within the overlap region, the resource assignment and scheduling circuitry 941 may be configured to determine that the sPDCCH carrying the sDCI is located in only that single RB set for rate-matching purposes. Therefore, the resource assignment and scheduling circuitry 941 may schedule the sPDSCH within the remaining portion of the other RB set when the RB sets are configured with rate-matching Mode 3. For example, the resource assignment and scheduling circuitry 941 may schedule the sPDSCH within a collection of RBs outside of the RB set within which the sDCI is scheduled outside the overlap region and outside of the overlap region contained within the other RB set. The resource assignment and scheduling circuitry 941 may further be configured to execute resource assignment and scheduling software 951 stored in the computer-readable medium 906 to implement one or more of the functions described herein.

The processor 904 may further include downlink (DL) traffic and control channel generation and transmission circuitry 942, configured to generate and transmit downlink user data traffic and control channels within one or more subframes, slots, and/or mini-slots or sTTIs. The DL traffic and control channel generation and transmission circuitry 942 may operate in coordination with the resource assignment and scheduling circuitry 941 to place the DL user data traffic and/or control information onto a time division duplex (TDD) or frequency division duplex (FDD) carrier by including the DL user data traffic and/or control information within one or more subframes, slots, and/or mini-slots or sTTIs in accordance with the resources assigned to the DL user data traffic and/or control information by the resource assignment and scheduling circuitry 941.

For example, the DL traffic and control channel generation and transmission circuitry 942 may be configured to operate in coordination with the resource assignment and scheduling circuitry 941 to generate a sPDCCH including sDCI and to transmit the sPDCCH within the RB sets allocated to the sPDDCH. In some examples, the RB sets allocated to the sPDCCH may include two overlapping RB sets. In some examples, the sDCI may include a downlink assignment scheduling a sPDSCH. The DL traffic and control channel generation and transmission circuitry 942 may further be configured to generate the sPDSCH and rate-match according to the respective rate-matching mode selected for the overlapping RB sets of the sPDCCH carrying the sDCI scheduling the sPDSCH.

In some examples, if the overlapping RB sets are configured with rate-matching Mode 3, the DL traffic and control channel generation and transmission circuitry 942 may be configured to rate-match the sPDSCH around both overlapping RB sets when the resource assignment and scheduling circuitry 941 schedules the sPDSCH outside of the overlapping RB sets (e.g., within a collection of RBs in the TTI outside of the two overlapping RB sets). In other examples, the DL traffic and control channel generation and transmission circuitry 942 may be configured to rate-match the sPDSCH around the sDCI in one of the overlapping RB sets when the resource assignment and scheduling circuitry 941 schedules the sPDSCH in that RB set (e.g., within a collection of RBs in the TTI outside of one of the RB sets within which the sDCI is located outside of the overlap region and outside of the overlap region contained within the other RB set).

The DL traffic and control channel generation and transmission circuitry 942 may further be configured to generate and transmit a rate-matching mode parameter 915 including the rate-matching mode selected for the overlapping RB sets to the scheduled entity via the transceiver 910. In some examples, the rate-matching mode parameter 915 may be transmitted via radio resource control (RRC) signaling. The DL traffic and control channel generation and transmission circuitry 942 may further be configured to execute DL traffic and control channel generation and transmission software 952 stored in the computer-readable medium 906 to implement one or more of the functions described herein.

The processor 904 may further include uplink (UL) traffic and control channel reception and processing circuitry 943, configured to receive and process uplink control channels and uplink traffic channels from one or more scheduled entities. For example, the UL traffic and control channel reception and processing circuitry 943 may be configured to receive uplink control information (UCI) or uplink user data traffic from one or more scheduled entities. In addition, the UL traffic and control channel reception and processing circuitry 943 may operate in coordination with the resource assignment and scheduling circuitry 941 to schedule UL user data traffic transmissions, DL user data traffic transmissions and/or DL user data traffic retransmissions in accordance with the received UCI. The UL traffic and control channel reception and processing circuitry 943 may further be configured to execute UL traffic and control channel reception and processing software 953 stored in the computer-readable medium 906 to implement one or more of the functions described herein.

Figure 10:
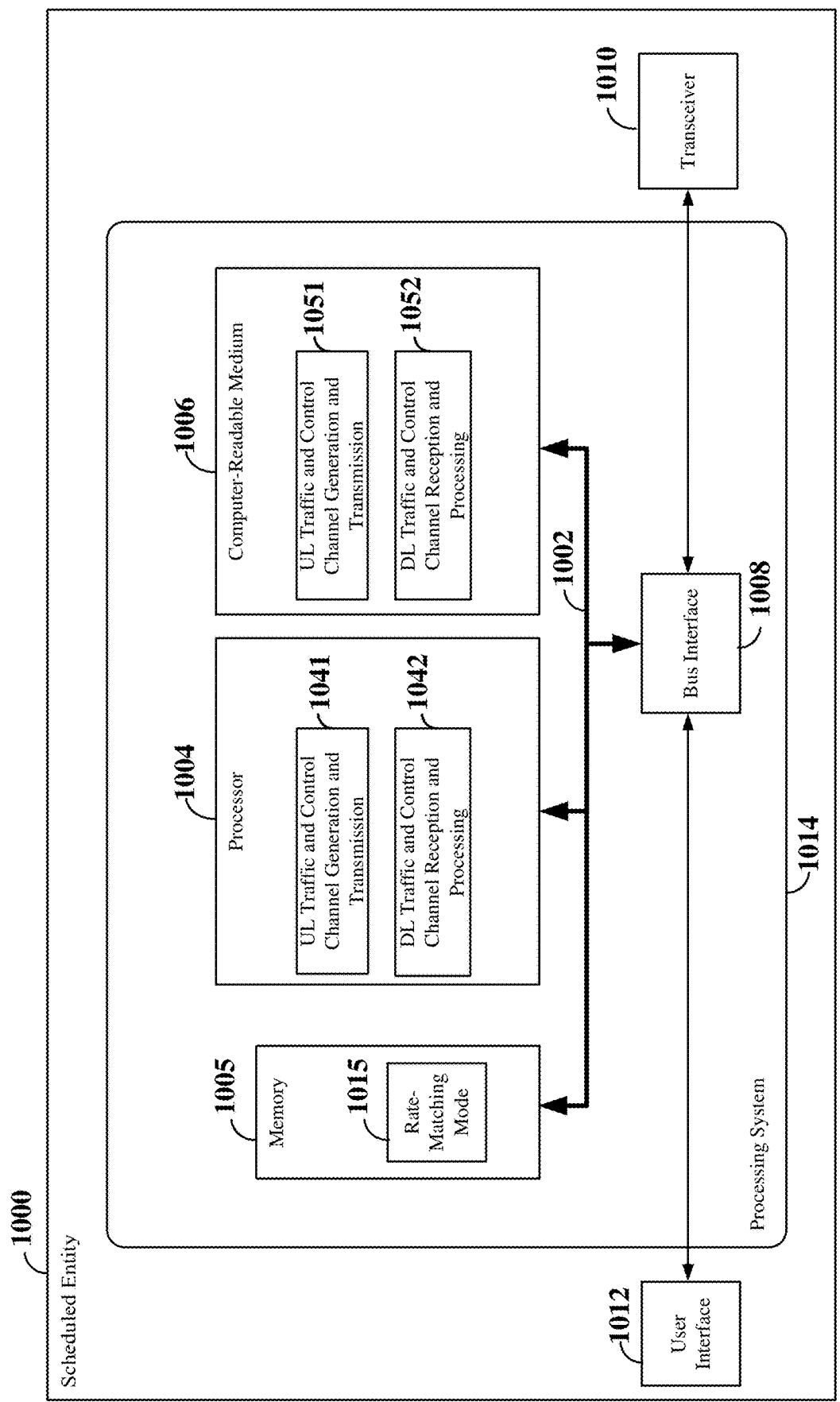
FIG. 10 is a block diagram illustrating an example of a hardware implementation for a scheduled entity employing a processing system.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS. 1 and 2.

The processing system 1014 may be substantially the same as the processing system 1014 illustrated in FIG. 10, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 10. That is, the processor 1004, as utilized in a scheduled entity 1000, may be used to implement any one or more of the processes described below.

In some aspects of the disclosure, the processor 1004 may include uplink (UL) traffic and control channel generation and transmission circuitry 1041, configured to generate and transmit uplink control/feedback/acknowledgement information on an UL control channel (e.g., a PUCCH) or UL traffic channel (e.g., a PUSCH) in accordance with an uplink grant. The UL traffic and control channel generation and transmission circuitry 1041 may further be configured to generate and transmit uplink user data traffic on an UL traffic channel (e.g., a PUSCH). The UL traffic and control channel generation and transmission circuitry 1041 may be configured to execute UL traffic and control channel generation and transmission software 1051 stored on the computer-readable medium 1006 to implement one or more of the functions described herein.

The processor 1004 may further include downlink (DL) traffic and control channel reception and processing circuitry 1042, configured for receiving and processing downlink user data traffic on a traffic channel, and to receive and process control information on one or more downlink control channels. For example, the DL traffic and control channel reception and processing circuitry 1042 may be configured to receive a PDCCH (e.g., sPDCCH) including DCI (e.g., sDCI) scheduling a PDSCH (e.g., sPDSCH) within two overlapping RB sets within a TTI (e.g., sTTI).

In some examples, the DL traffic and control channel reception and processing circuitry 1042 may be configured to identify sCCEs forming a decoding candidate over which the sDCI is detected within the two overlapping RB sets. In some examples, the DL traffic and control channel reception and processing circuitry 1042 may further be configured to determine whether the sCCEs are entirely contained within shared resource elements (e.g., an overlap region) between each of two overlapping RB sets, and if so, perform rate-matching of the sPDSCH around each of the two overlapping RB sets when rate-matching Mode 3 is configured for each of the RB sets. In this example, the DL traffic and control channel reception and processing circuitry 1042 may be configured to receive the sPDSCH within a collection of RBs in the sTTI outside of the two overlapping RB sets.

In other examples, the DL traffic and control channel reception and processing circuitry 1042 may further be configured to determine whether at least one of the sCCEs is located within only a single RB set (e.g., not within the overlap region), and if so, perform rate-matching around the sDCI in the other RB set (for which the sCCEs are located within the overlap region). In this example, the DL traffic and control channel reception and processing circuitry 1042 may be configured to receive the sPDSCH within a collection of RBs in the sTTI outside of the RB set within which the sDCI is located outside of the overlap region and outside of the overlap region contained within the other RB set.

The DL traffic and control channel reception and processing circuitry 1042 may further be configured to determine a rate-matching mode 1015 associated with the each of the two overlapping RB sets. In some examples, the DL traffic and control channel reception and processing circuitry 1042 may be configured to receive, via the transceiver 1010, a rate-matching mode parameter including the rate-matching mode 1015 (e.g., Mode 3) from the scheduling entity. In some examples, the rate-matching mode parameter may be received via RRC signaling. The DL traffic and control channel reception and processing circuitry 1042 may be configured to execute DL traffic and control channel reception and processing software 1052 stored in the computer-readable medium 1006 to implement one or more of the functions described herein.

Figure 11:
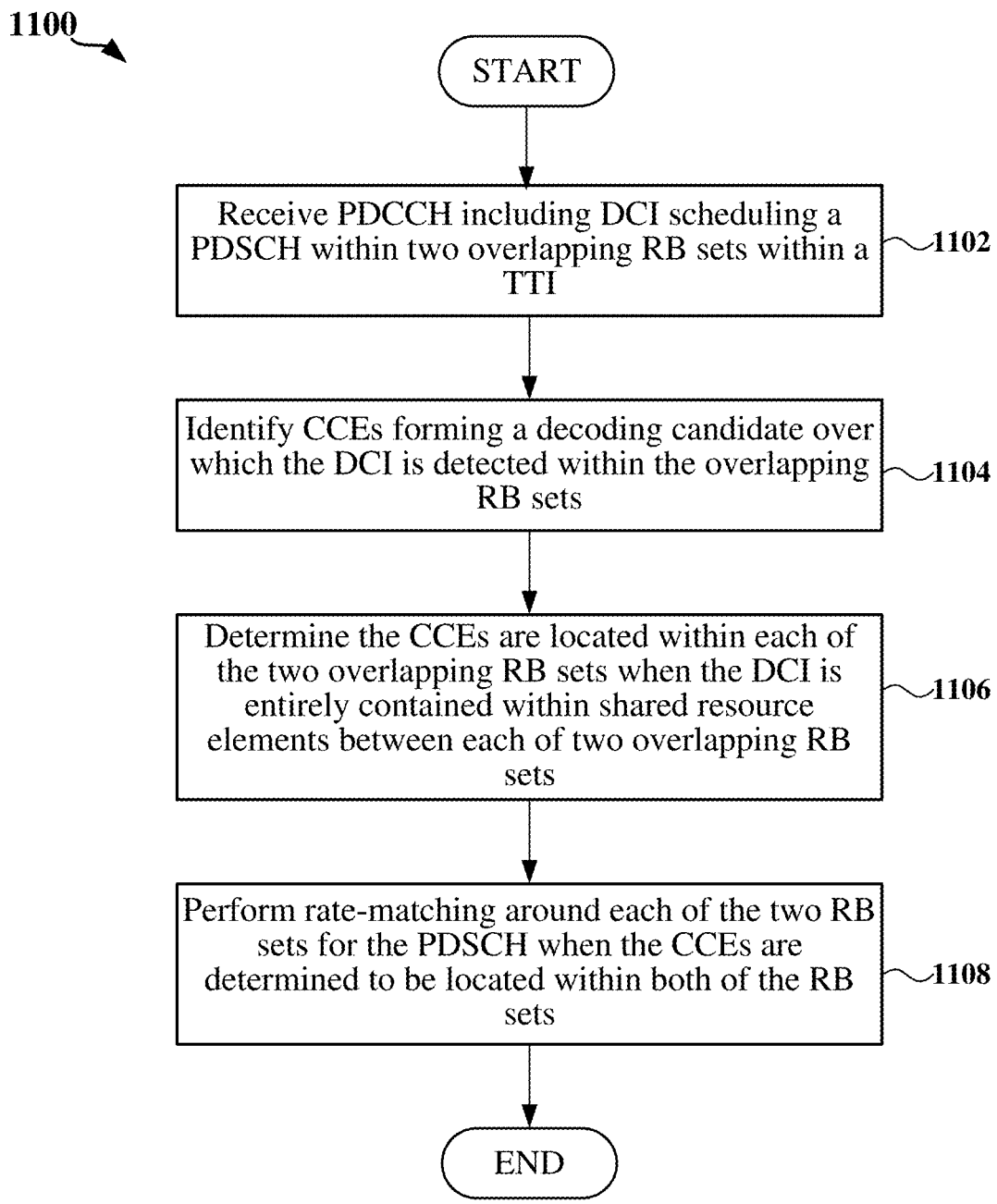
FIG. 11 is a flow chart illustrating an exemplary process for rate-matching when overlapping RB sets are configured for a user equipment (UE).

FIG. 11 is a flow chart illustrating an exemplary process 1100 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 1000 illustrated in FIG. 10. In some examples, the process 1100 may be carried out by any suitable apparatus or means for carrying out the functions or algorithm described below.

At block 1102, the scheduled entity may receive a physical downlink control channel (PDCCH) including downlink control information (DCI) scheduling a physical downlink shared channel (PDSCH) within two overlapping resource block (RB) sets of a plurality of RB sets within a transmission time interval (TTI). Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the DL traffic and control channel reception and processing circuitry 1042 and transceiver 1010 shown and described in reference to FIG. 10 may receive the PDCCH from a scheduling entity.

At block 1104, the scheduled entity may identify control channel elements (CCEs) forming a decoding candidate over which the DCI is detected within the two overlapping RB sets. In some examples, the CCEs are shortened CCEs (sCCEs). For example, the DL traffic and control channel reception and processing circuitry 1042 shown and described above in reference to FIG. 10 may identify the CCEs.

At block 1106, the scheduled entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the DL traffic and control channel reception and processing circuitry 1042 shown and described above in reference to FIG. 10 may determine that the CCEs are entirely contained within shared resource elements.

At block 1108, the scheduled entity may perform rate-matching around each of the two overlapping RB sets for the PDSCH when the CCEs are determined to be located within each of the two overlapping RB sets. In some examples, the scheduled entity may perform rate-matching around each of the overlapping RB sets when rate-matching Mode 3 is configured for both of the overlapping RB sets. For example, the DL traffic and control channel reception and processing circuitry 1042 shown and described above in reference to FIG. 10 may perform rate-matching.

Figure 12:
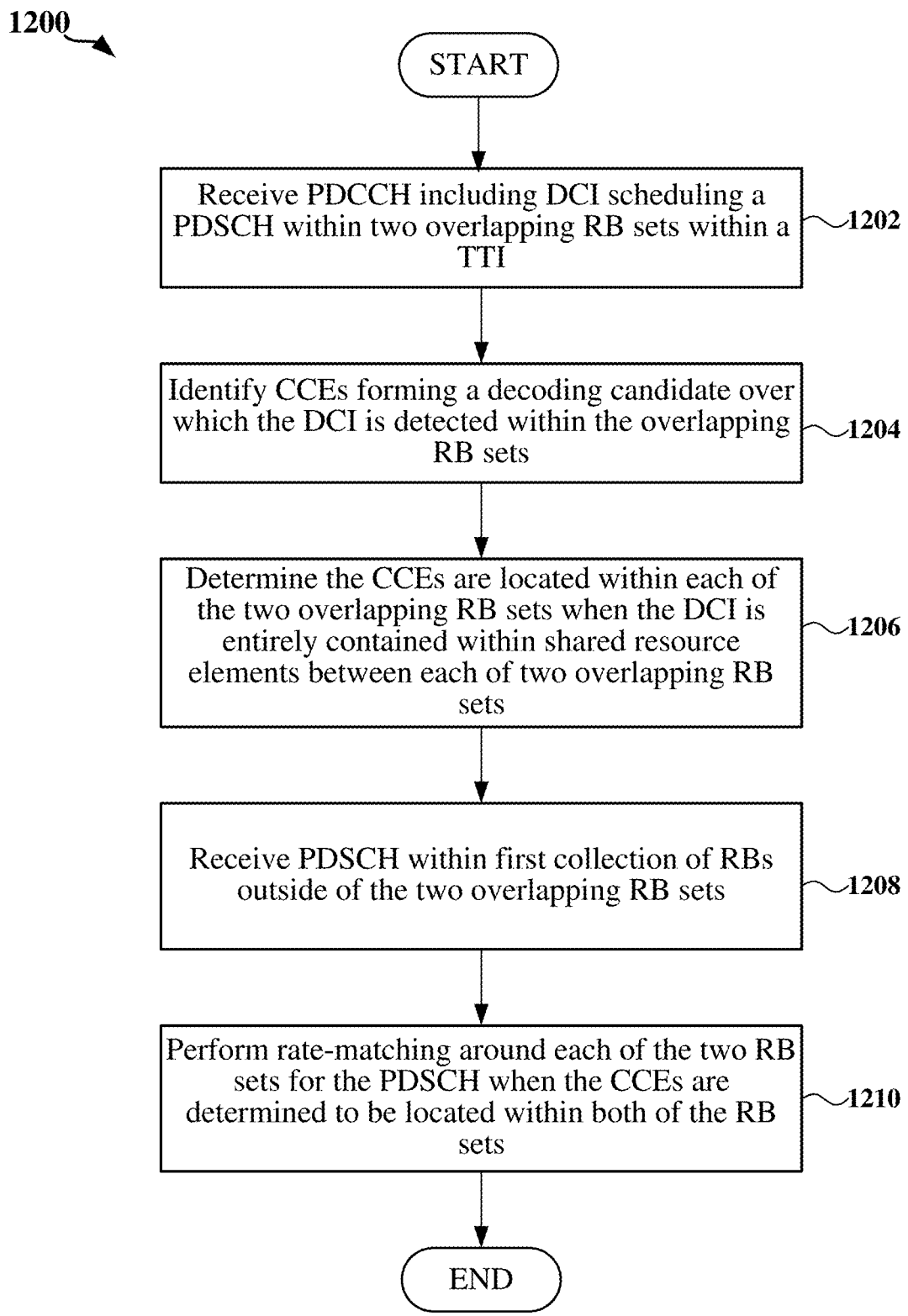
FIG. 12 is a flow chart illustrating another exemplary process for rate-matching when overlapping RB sets are configured for a UE.

FIG. 12 is a flow chart illustrating another exemplary process 1200 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 1000 illustrated in FIG. 10. In some examples, the process 1200 may be carried out by any suitable apparatus or means for carrying out the functions or algorithm described below.

At block 1202, the scheduled entity may receive a physical downlink control channel (PDCCH) including downlink control information (DCI) scheduling a physical downlink shared channel (PDSCH) within two overlapping resource block (RB) sets of a plurality of RB sets within a transmission time interval (TTI). Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI).

In addition, the PDSCH may be a shortened PDSCH (sPDSCH). In some examples, the sTTI including the sPDCCH, sDCI and sPDSCH may include no more than seven symbols (e.g., OFDM symbols). For example, the DL traffic and control channel reception and processing circuitry 1042 and transceiver 1010 shown and described in reference to FIG. 10 may receive the PDCCH from a scheduling entity.

At block 1204, the scheduled entity may identify control channel elements (CCEs) forming a decoding candidate over which the DCI is detected within the two overlapping RB sets. In some examples, the CCEs are shortened CCEs (sCCEs). For example, the DL traffic and control channel reception and processing circuitry 1042 shown and described above in reference to FIG. 10 may identify the CCEs.

At block 1206, the scheduled entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the DL traffic and control channel reception and processing circuitry 1042 shown and described above in reference to FIG. 10 may determine that the CCEs are entirely contained within shared resource elements.

At block 1208, the scheduled entity may receive the PDSCH within a first collection of RBs in the TTI outside of the two overlapping RB sets. In some examples, the scheduled entity may receive the PDSCH within the first collection of RBs when rate-matching Mode 3 is configured for both of the overlapping RB sets. For example, the DL traffic and control channel reception and processing circuitry 1042 and transceiver 1010 shown and described above in reference to FIG. 10 may receive the PDSCH.

At block 1210, the scheduled entity may perform rate-matching around each of the two overlapping RB sets for the PDSCH when the CCEs are determined to be located within each of the two overlapping RB sets. In some examples, the scheduled entity may perform rate-matching around each of the overlapping RB sets when rate-matching Mode 3 is configured for both of the overlapping RB sets. For example, the DL traffic and control channel reception and processing circuitry 1042 shown and described above in reference to FIG. 10 may perform rate-matching.

Figure 13:
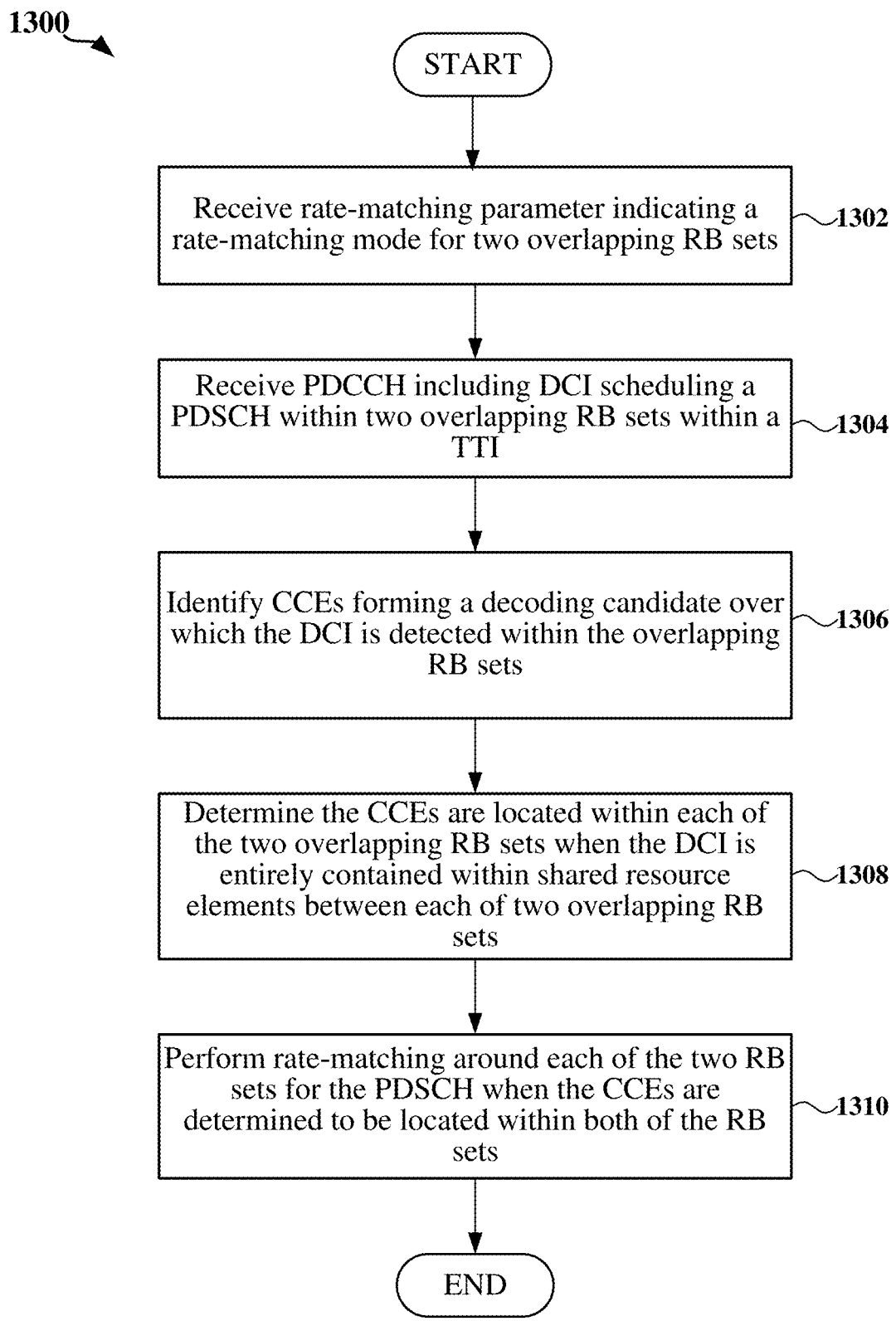
FIG. 13 is a flow chart illustrating another exemplary process for rate-matching when overlapping RB sets are configured for a UE.

FIG. 13 is a flow chart illustrating another exemplary process 1300 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 1000 illustrated in FIG. 10. In some examples, the process 1300 may be carried out by any suitable apparatus or means for carrying out the functions or algorithm described below.

At block 1302, the scheduled entity may receive a rate-matching mode parameter from a scheduling entity indicating a rate-matching mode configured for each of two overlapping resource block (RB) sets of a plurality of RB sets. Each of the RB sets may include a respective group of resource blocks (RBs), and each RB may include a plurality of resource elements. In some examples, the rate-matching mode parameter may indicate that rate-matching Mode 3 is configured for the overlapping RB sets. For example, in rate-matching Mode 3, rate-matching is performed around at least one RB set of the two overlapping RB sets when downlink control information (DCI) scheduling a physical downlink shared channel (PDSCH) is detected in the at least one RB set. In some examples, the rate-matching mode parameter may be received via radio resource control (RRC) signaling. For example, the DL traffic and control channel reception and processing circuitry 1042 and transceiver 1010 may receive the rate-matching mode parameter.

At block 1304, the scheduled entity may receive a physical downlink control channel (PDCCH) including the DCI scheduling a PDSCH within the two overlapping RB sets within a transmission time interval (TTI). In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the DL traffic and control channel reception and processing circuitry 1042 and transceiver 1010 shown and described in reference to FIG. 10 may receive the PDCCH from a scheduling entity.

At block 1306, the scheduled entity may identify control channel elements (CCEs) forming a decoding candidate over which the DCI is detected within the two overlapping RB sets. In some examples, the CCEs are shortened CCEs (sCCEs). For example, the DL traffic and control channel reception and processing circuitry 1042 shown and described above in reference to FIG. 10 may identify the CCEs.

At block 1308, the scheduled entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the DL traffic and control channel reception and processing circuitry 1042 shown and described above in reference to FIG. 10 may determine that the CCEs are entirely contained within shared resource elements.

At block 1310, the scheduled entity may perform rate-matching around each of the two overlapping RB sets for the PDSCH when the CCEs are determined to be located within each of the two overlapping RB sets and the rate-matching mode parameter indicates that rate-matching Mode 3 is configured for both of the overlapping RB sets. For example, the DL traffic and control channel reception and processing circuitry 1042 shown and described above in reference to FIG. 10 may perform rate-matching.

Figure 14:
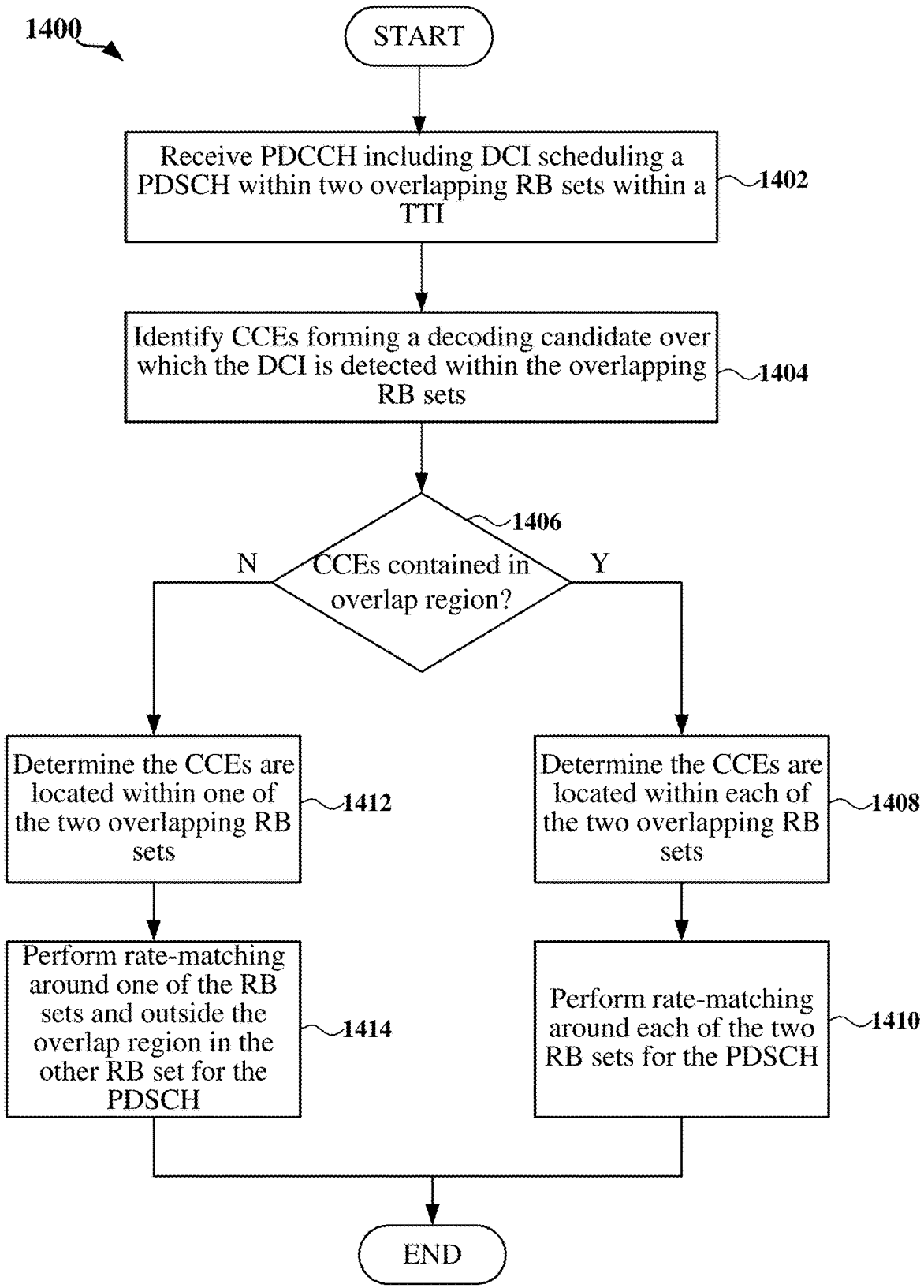
FIG. 14 is a flow chart illustrating another exemplary process for rate-matching when overlapping RB sets are configured for a UE.

FIG. 14 is a flow chart illustrating another exemplary process 1400 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduled entity 1000 illustrated in FIG. 10. In some examples, the process 1400 may be carried out by any suitable apparatus or means for carrying out the functions or algorithm described below.

At block 1402, the scheduled entity may receive a physical downlink control channel (PDCCH) including downlink control information (DCI) scheduling a physical downlink shared channel (PDSCH) within two overlapping resource block (RB) sets of a plurality of RB sets within a transmission time interval (TTI). Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the DL traffic and control channel reception and processing circuitry 1042 and transceiver 1010 shown and described in reference to FIG. 10 may receive the PDCCH from a scheduling entity.

At block 1404, the scheduled entity may identify control channel elements (CCEs) forming a decoding candidate over which the DCI is detected within the two overlapping RB sets. In some examples, the CCEs are shortened CCEs (sCCEs). For example, the DL traffic and control channel reception and processing circuitry 1042 shown and described above in reference to FIG. 10 may identify the CCEs.

At block 1406, the scheduled entity may determine whether the CCEs are entirely contained within an overlap region including shared resource elements between each of the two overlapping RB sets. If the CCEs are entirely contained within the overlap region (Y branch of block 1406), at block 1408, the scheduled entity may determine the CCEs are located within each of the two overlapping RB sets. For example, the DL traffic and control channel reception and processing circuitry 1042 shown and described above in reference to FIG. 10 may determine that the CCEs are entirely contained within shared resource elements, and as such, located within each of the two overlapping RB sets.

At block 1410, the scheduled entity may perform rate-matching around each of the two overlapping RB sets for the PDSCH when the CCEs are determined to be located within each of the two overlapping RB sets. In some examples, the scheduled entity may perform rate-matching around each of the overlapping RB sets when rate-matching Mode 3 is configured for both of the overlapping RB sets. For example, the DL traffic and control channel reception and processing circuitry 1042 shown and described above in reference to FIG. 10 may perform rate-matching.

If the CCEs are not entirely contained within the overlap region (N branch of block 1406), at block 1412, the scheduled entity may determine that the CCEs are located within only one of the two overlapping RB sets. In some examples, at least one of the CCEs may be located in only a first RB set of the two overlapping RB sets, whereas remaining ones of the CCEs may be located in the overlap region between each of the two overlapping RB sets. Thus, in this example, the CCEs may be considered to be completely located in the first RB set (e.g., as all CCEs are located in the first RB set, even though some of the CCEs are located in the overlap region). For example, the DL traffic and control channel reception and processing circuitry 1042 shown and described above in reference to FIG. 10 may determine that the CCEs are located within only the first RB set of the two overlapping RB sets.

At block 1414, the scheduled entity may perform rate-matching around the first RB set and the overlap region in a second RB set of the two overlapping RB sets for the PDSCH when the CCEs are determined to be located within only the first RB set. In some examples, the scheduled entity may perform rate-matching around the first RB set and the overlap region in the second RB set when rate-matching Mode 3 is configured for both of the overlapping RB sets. For example, the DL traffic and control channel reception and processing circuitry 1042 shown and described above in reference to FIG. 10 may perform rate-matching.

Figure 15:
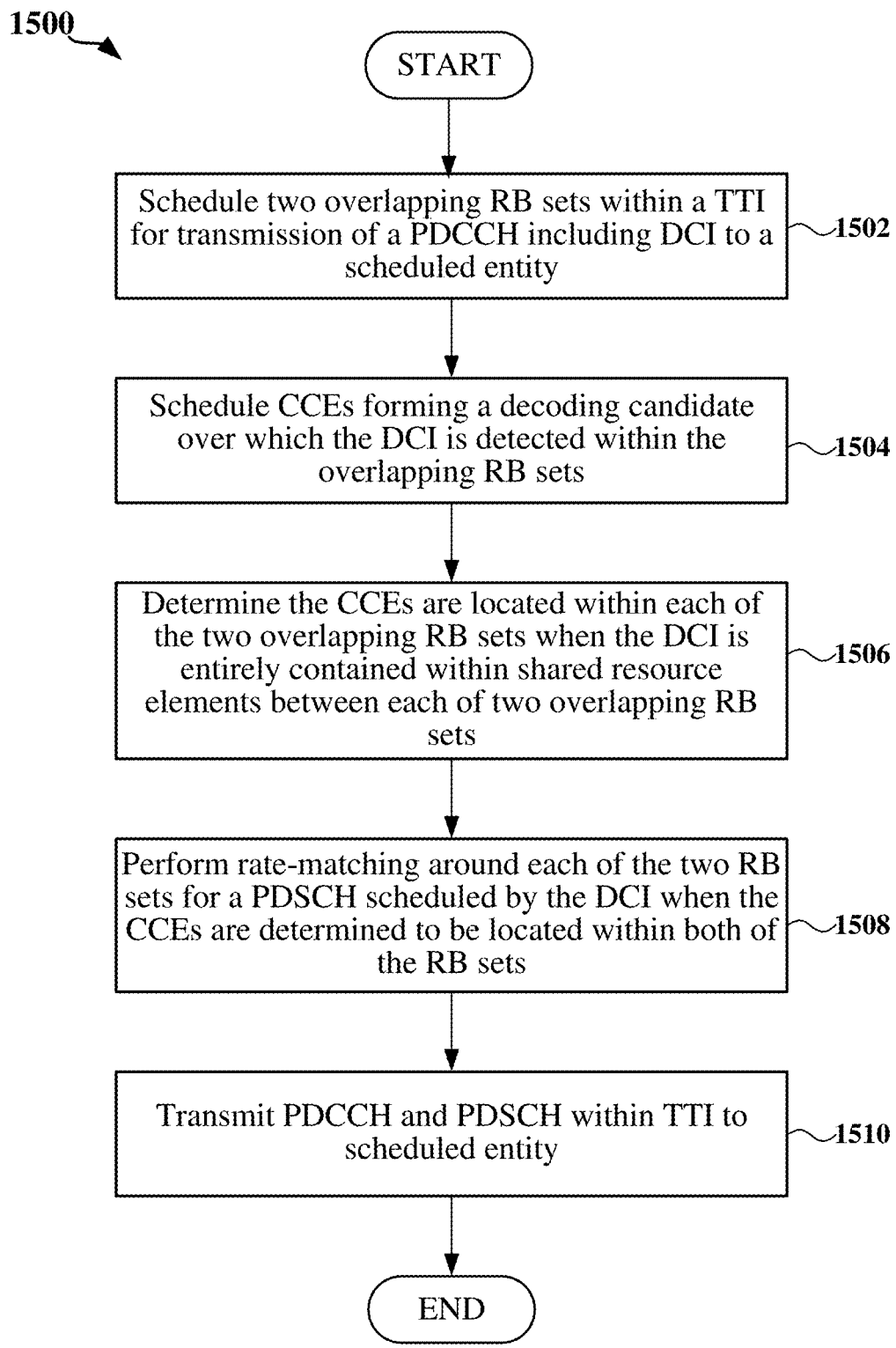
FIG. 15 is a flow chart illustrating another exemplary process for rate-matching when overlapping RB sets are configured for a UE.

FIG. 15 is a flow chart illustrating another exemplary process 1500 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 900 illustrated in FIG. 9. In some examples, the process 1500 may be carried out by any suitable apparatus or means for carrying out the functions or algorithm described below.

At block 1502, the scheduling entity may schedule two overlapping RB sets of a plurality of RB sets within a transmission time interval (TTI) for transmission of a physical downlink control channel (PDCCH) including downlink control information (DCI) to a scheduled entity. Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the resource assignment and scheduling circuitry 941 shown and described in reference to FIG. 9 may schedule the overlapping RB sets for the PDCCH.

At block 1504, the scheduling entity may schedule control channel elements (CCEs) forming a decoding candidate over which the DCI is detected within the two overlapping RB sets. In some examples, the CCEs are shortened CCEs (sCCEs). For example, the resource assignment and scheduling circuitry 941 shown and described above in reference to FIG. 9 may schedule the CCEs.

At block 1506, the scheduling entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the resource assignment and scheduling circuitry 941 shown and described above in reference to FIG. 9 may determine that the CCEs are entirely contained within shared resource elements.

At block 1508, the scheduling entity may perform rate-matching around each of the two overlapping RB sets for a physical downlink shared channel (PDSCH) scheduled by the DCI when the CCEs are determined to be located within each of the two overlapping RB sets. In some examples, the scheduling entity may perform rate-matching around each of the overlapping RB sets when rate-matching Mode 3 is configured for both of the overlapping RB sets. For example, the DL traffic and control channel generation and transmission circuitry 942 shown and described above in reference to FIG. 9 may perform rate-matching.

At block 1510, the scheduling entity may transmit the PDCCH and PDSCH within the TTI to the scheduled entity. In some examples, the PDCCH is transmitted over the CCEs scheduled for the DCI. For example, the DL traffic and control channel generation and transmission circuitry 942 and transceiver 910 shown and described above in reference to FIG. 9 may transmit the PDCCH and PDSCH to the scheduled entity.

Figure 16:
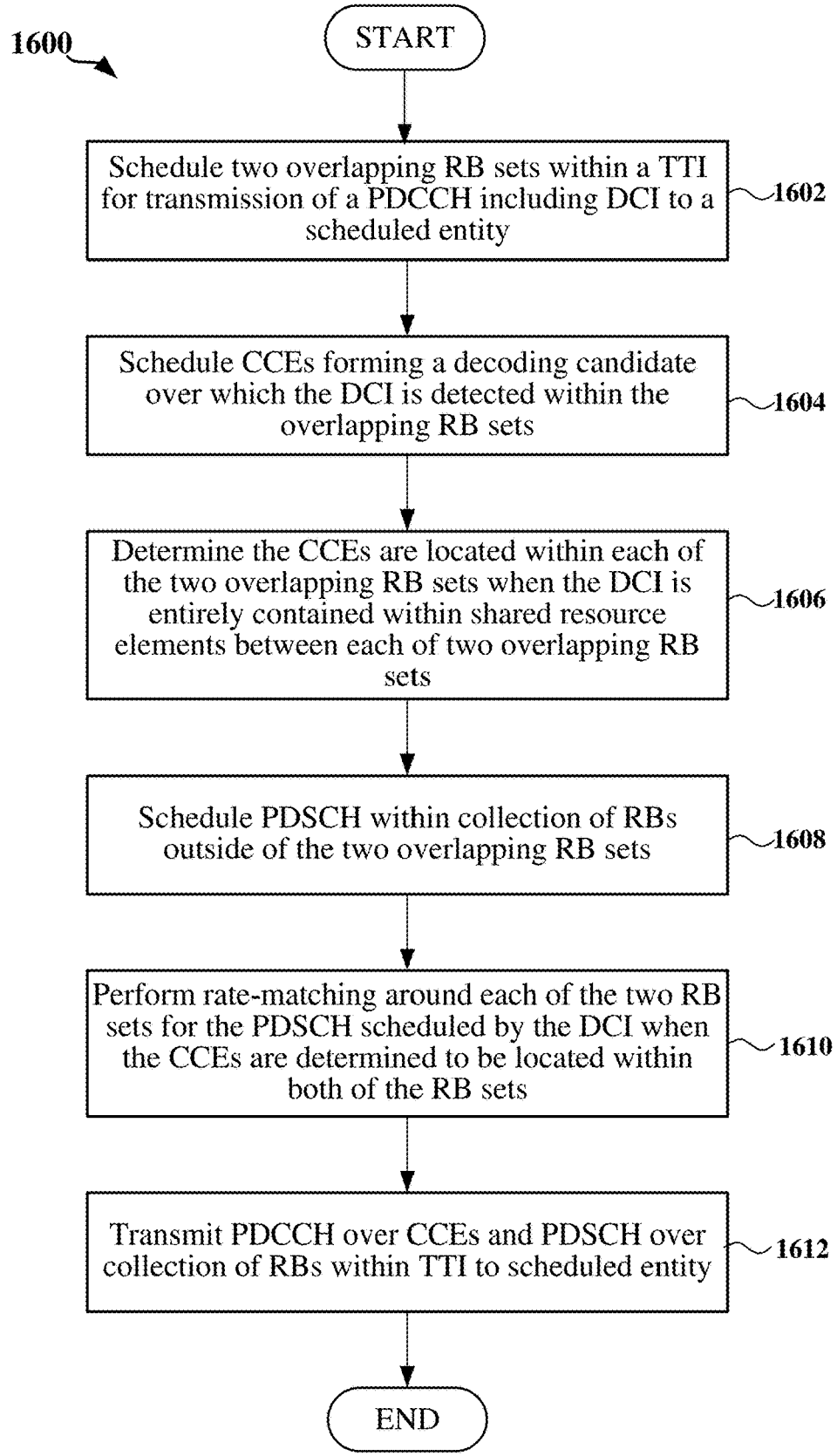
FIG. 16 is a flow chart illustrating another exemplary process for rate-matching when overlapping RB sets are configured for a UE.

FIG. 16 is a flow chart illustrating another exemplary process 1600 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity 900 illustrated in FIG. 9. In some examples, the process 1600 may be carried out by any suitable apparatus or means for carrying out the functions or algorithm described below.

At block 1602, the scheduling entity may schedule two overlapping RB sets of a plurality of RB sets within a transmission time interval (TTI) for transmission of a physical downlink control channel (PDCCH) including downlink control information (DCI) to a scheduled entity. Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the resource assignment and scheduling circuitry 941 shown and described in reference to FIG. 9 may schedule the overlapping RB sets for the PDCCH.

At block 1604, the scheduling entity may schedule control channel elements (CCEs) forming a decoding candidate over which the DCI is detected within the two overlapping RB sets. In some examples, the CCEs are shortened CCEs (sCCEs). For example, the resource assignment and scheduling circuitry 941 shown and described above in reference to FIG. 9 may schedule the CCEs.

At block 1606, the scheduling entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the resource assignment and scheduling circuitry 941 shown and described above in reference to FIG. 9 may determine that the CCEs are entirely contained within shared resource elements.

At block 1608, the scheduling entity may schedule a physical downlink shared channel (PDSCH) within a collection of RBs outside of the two overlapping RB sets. For example, the resource assignment and scheduling circuitry 941 shown and described above in reference to FIG. 9 may schedule the PDSCH.

At block 1610, the scheduling entity may perform rate-matching around each of the two overlapping RB sets for the PDSCH scheduled by the DCI when the CCEs are determined to be located within each of the two overlapping RB sets. In some examples, the scheduling entity may perform rate-matching around each of the overlapping RB sets when rate-matching Mode 3 is configured for both of the overlapping RB sets. For example, the DL traffic and control channel generation and transmission circuitry 942 shown and described above in reference to FIG. 9 may perform rate-matching.

At block 1612, the scheduling entity may transmit the PDCCH and PDSCH within the TTI to the scheduled entity. In some examples, the PDCCH is transmitted over the CCEs scheduled for the DCI and the PDSCH is transmitted over the collection of RBs scheduled for the PDSCH. For example, the DL traffic and control channel generation and transmission circuitry 942 and transceiver 910 shown and described above in reference to FIG. 9 may transmit the PDCCH and PDSCH to the scheduled entity.

Figure 17:
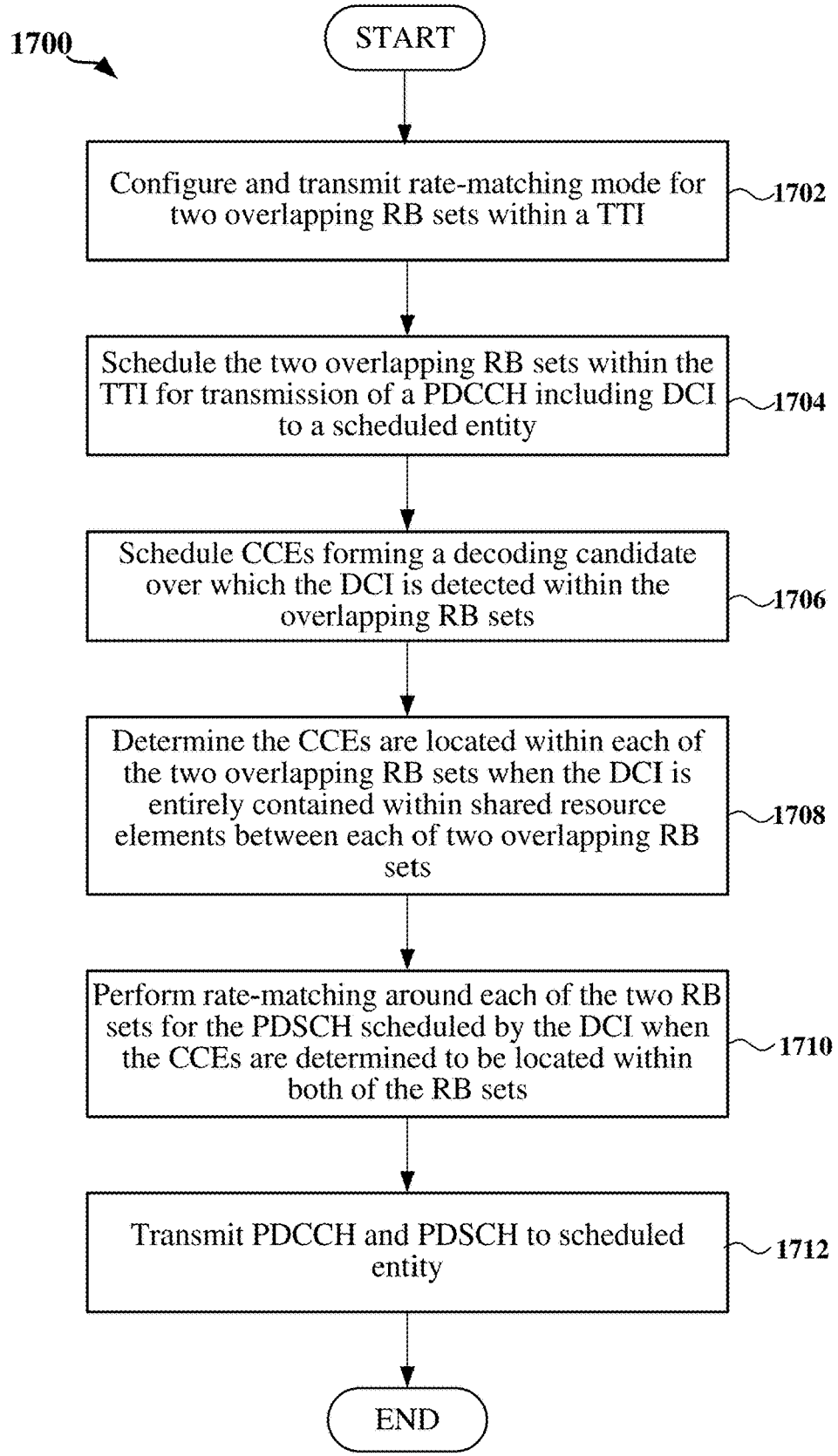
FIG. 17 is a flow chart illustrating another exemplary process for rate-matching when overlapping RB sets are configured for a UE.

FIG. 17 is a flow chart illustrating another exemplary process 1700 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 900 illustrated in FIG. 9. In some examples, the process 1700 may be carried out by any suitable apparatus or means for carrying out the functions or algorithm described below.

At block 1702, the scheduling entity may configure a rate-matching mode associated with each of two overlapping RB sets associated with a scheduled entity and generate and transmit rate-matching mode parameter including the rate-matching mode to the scheduled entity. Each of the RB sets may include a respective group of resource blocks (RBs), and each RB may include a plurality of resource elements. In some examples, the rate-matching mode parameter may indicate that rate-matching Mode 3 is configured for the overlapping RB sets. For example, in rate-matching Mode 3, rate-matching is performed around at least one RB set of the two overlapping RB sets when downlink control information (DCI) scheduling a physical downlink shared channel (PDSCH) is detected in the at least one RB set. In some examples, the rate-matching mode parameter may be transmitted to the scheduled entity via radio resource control (RRC) signaling. For example, the DL traffic and control channel generation and transmission circuitry 942 and transceiver 910 shown and described above in reference to FIG. 9 may configure the rate-matching mode and generate and transmit the rate-matching mode parameter to the scheduled entity.

At block 1704, the scheduling entity may schedule the two overlapping RB sets of a plurality of RB sets within a transmission time interval (TTI) for transmission of a physical downlink control channel (PDCCH) including downlink control information (DCI) to a scheduled entity. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the resource assignment and scheduling circuitry 941 shown and described in reference to FIG. 9 may schedule the overlapping RB sets for the PDCCH.

At block 1706, the scheduling entity may schedule control channel elements (CCEs) forming a decoding candidate over which the DCI is detected within the two overlapping RB sets. In some examples, the CCEs are shortened CCEs (sCCEs). For example, the resource assignment and scheduling circuitry 941 shown and described above in reference to FIG. 9 may schedule the CCEs.

At block 1708, the scheduling entity may determine the CCEs are located within each of the two overlapping RB sets only when the CCEs are entirely contained within shared resource elements between each of the two overlapping RB sets. For example, the CCEs may be entirely included within an overlap region (e.g., overlap region 612 shown in FIG. 6). For example, the resource assignment and scheduling circuitry 941 shown and described above in reference to FIG. 9 may determine that the CCEs are entirely contained within shared resource elements.

At block 1710, the scheduling entity may perform rate-matching around each of the two overlapping RB sets for a physical downlink shared channel (PDSCH) scheduled by the DCI when the CCEs are determined to be located within each of the two overlapping RB sets. In some examples, the scheduling entity may perform rate-matching around each of the overlapping RB sets when rate-matching Mode 3 is configured for both of the overlapping RB sets. For example, the DL traffic and control channel generation and transmission circuitry 942 shown and described above in reference to FIG. 9 may perform rate-matching.

At block 1712, the scheduling entity may transmit the PDCCH and PDSCH within the TTI to the scheduled entity. In some examples, the PDCCH is transmitted over the CCEs scheduled for the DCI. For example, the DL traffic and control channel generation and transmission circuitry 942 and transceiver 910 shown and described above in reference to FIG. 9 may transmit the PDCCH and PDSCH to the scheduled entity.

Figure 18:
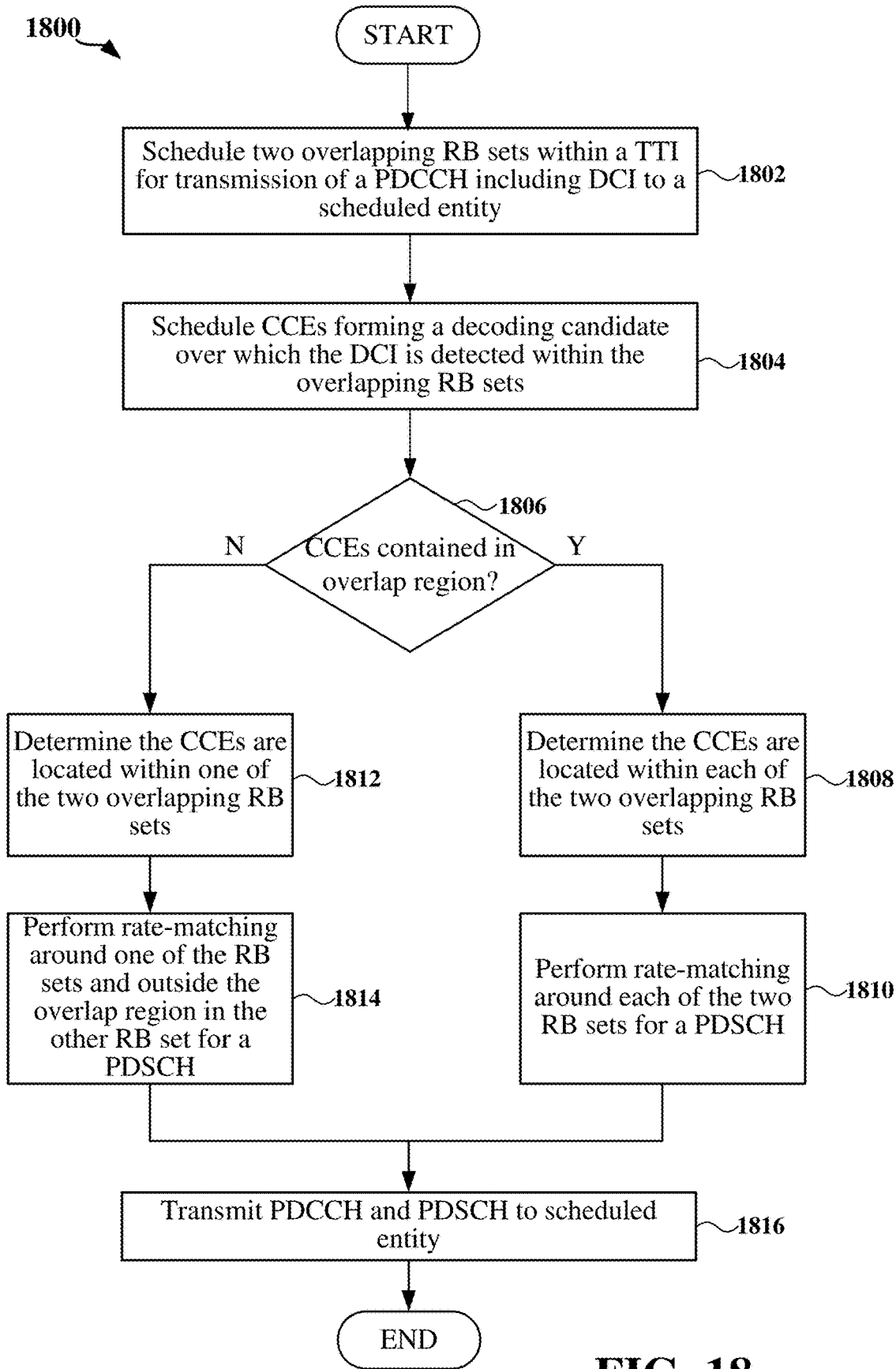
FIG. 18 is a flow chart illustrating another exemplary process for rate-matching when overlapping RB sets are configured for a UE.

FIG. 18 is a flow chart illustrating another exemplary process 1800 for rate-matching when overlapping RB sets are configured for a user equipment (UE) in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduling entity 900 illustrated in FIG. 9. In some examples, the process 1800 may be carried out by any suitable apparatus or means for carrying out the functions or algorithm described below.

At block 1802, the scheduling entity may schedule two overlapping RB sets of a plurality of RB sets within a transmission time interval (TTI) for transmission of a physical downlink control channel (PDCCH) including downlink control information (DCI) to a scheduled entity. Each of the RB sets may include a respective group of resource blocks (RBs), and each RB may include a plurality of resource elements. In some examples, the TTI is a shortened TTI (sTTI), PDCCH is a shortened PDCCH (sPDDCH) and the DCI is a shortened DCI (sDCI). In addition, the PDSCH may be a shortened PDSCH (sPDSCH). In some examples, the sTTI including the sPDCCH, sDCI and sPDSCH may include no more than seven symbols (e.g., OFDM symbols). For example, the resource assignment and scheduling circuitry 941 shown and described in reference to FIG. 9 may schedule the overlapping RB sets for the PDCCH.

At block 1804, the scheduling entity may schedule control channel elements (CCEs) forming a decoding candidate over which the DCI is detected within the two overlapping RB sets. In some examples, the CCEs are shortened CCEs (sCCEs). For example, the resource assignment and scheduling circuitry 941 shown and described above in reference to FIG. 9 may schedule the CCEs.

At block 1806, the scheduling entity may determine whether the CCEs are entirely contained within an overlap region including shared resource elements between each of the two overlapping RB sets. If the CCEs are entirely contained within the overlap region (Y branch of block 1806), at block 1808, the scheduling entity may determine the CCEs are located within each of the two overlapping RB sets. For example, the resource assignment and scheduling circuitry 941 and/or the DL traffic and control channel generation and transmission circuitry 942 shown and described above in reference to FIG. 9 may determine that the CCEs are entirely contained within shared resource elements, and as such, located within each of the two overlapping RB sets.

At block 1810, the scheduling entity may perform rate-matching around each of the two overlapping RB sets for the PDSCH when the CCEs are determined to be located within each of the two overlapping RB sets. In some examples, the scheduling entity may perform rate-matching around each of the overlapping RB sets when rate-matching Mode 3 is configured for both of the overlapping RB sets. For example, the DL traffic and control channel generation and transmission circuitry 942 shown and described above in reference to FIG. 9 may perform rate-matching.

If the CCEs are not entirely contained within the overlap region (N branch of block 1806), at block 1812, the scheduling entity may determine that the CCEs are located within only one of the two overlapping RB sets. In some examples, at least one of the CCEs may be located in only a first RB set of the two overlapping RB sets, whereas remaining ones of the CCEs may be located in the overlap region between each of the two overlapping RB sets. Thus, in this example, the CCEs may be considered to be completely located in the first RB set (e.g., as all CCEs are located in the first RB set, even though some of the CCEs are located in the overlap region). For example, the resource assignment and scheduling circuitry 941 and/or the DL traffic and control channel generation and transmission circuitry 942 shown and described above in reference to FIG. 9 may determine that the CCEs are located within only the first RB set of the two overlapping RB sets.

At block 1814, the scheduling entity may perform rate-matching around the first RB set and the overlap region in a second RB set of the two overlapping RB sets for the PDSCH when the CCEs are determined to be located within only the first RB set. In some examples, the scheduling entity may perform rate-matching around the first RB set and the overlap region in the second RB set when rate-matching Mode 3 is configured for both of the overlapping RB sets. For example, the DL traffic and control channel generation and transmission circuitry 942 shown and described above in reference to FIG. 9 may perform rate-matching.

At block 1818, the scheduling entity may transmit the PDCCH and PDSCH within the TTI to the scheduled entity. In some examples, the PDCCH is transmitted over the CCEs scheduled for the DCI. For example, the DL traffic and control channel generation and transmission circuitry 942 and transceiver 910 shown and described above in reference to FIG. 9 may transmit the PDCCH and PDSCH to the scheduled entity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions describe in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 9, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity, the method comprising:
receiving a physical downlink control channel (PDCCH) within two overlapping resource block (RB) sets of a plurality of RB sets within a transmission time interval (TTI), wherein each of the plurality of RB sets comprises a respective group of RBs, each of the RBs comprising a plurality of resource elements, wherein the PDCCH comprises downlink control information (DCI) scheduling a physical downlink shared channel (PDSCH);
identifying control channel elements (CCEs) forming a decoding candidate over which the DCI is detected within the two overlapping RB sets;
determining the CCEs are located within each of the two overlapping RB sets only when the CCEs are entirely contained within an overlap region comprising shared resource elements of the plurality of resource elements between each of the two overlapping RB sets, wherein the two overlapping RB sets are only partially overlapping such that each comprises respective resource elements of the plurality of resource elements outside of the overlap region; and
performing rate-matching around each of the two overlapping RB sets for the PDSCH when the CCEs are determined to be located within each of the two overlapping RB sets.

2. The method of claim 1, further comprising:
receiving the PDSCH within a first collection of RBs in the TTI outside of the two overlapping RB sets.

3. The method of claim 1, further comprising:
determining a rate-matching mode associated with each of the two overlapping RB sets indicates that rate-matching is performed around at least one RB set of the two overlapping RB sets when the DCI scheduling the PDSCH is detected in the at least one RB set.

4. The method of claim 3, further comprising:
receiving a rate-matching mode parameter comprising the rate-matching mode via radio resource control (RRC) signaling.

5. The method of claim 1, further comprising:
determining the CCEs are located within a first RB set of the two overlapping RB sets when at least one of the CCEs is located within only the first RB set and remaining ones of the CCEs are located within the overlap region between each of the two overlapping RB sets; and
performing rate-matching around the first RB set and the overlap region in a second RB set of the two overlapping RB sets for the PDSCH when the CCEs are determined to be located within the first RB set.

6. The method of claim 5, further comprising:
receiving the PDSCH within a second collection of RBs in the TTI outside of the first RB set and outside of the overlap region contained within the second RB set, wherein the second collection of RBs comprises a portion of the second RB set that is outside of the overlap region.

7. The method of claim 1, wherein the TTI comprises a shortened TTI (sTTI), the PDCCH comprises a shortened PDCCH (sPDCCH) and the DCI comprises a shortened DCI (sDCI).

8. The method of claim 7, wherein the sTTI comprises no more than seven symbols.

9. A scheduled entity in a wireless communication network, comprising:
- a transceiver for wireless communication with a scheduling entity;
- a memory; and
- a processor communicatively coupled to the transceiver and the memory, the processor configured to:
  - receive a physical downlink control channel (PDCCH) from the scheduling entity within two overlapping resource block (RB) sets of a plurality of RB sets within a transmission time interval (TTI) via the transceiver, wherein each of the plurality of RB sets comprises a respective group of RBs, each of the RBs comprising a plurality of resource elements, wherein the PDCCH comprises downlink control information (DCI) scheduling a physical downlink shared channel (PDSCH);
  - identify control channel elements (CCEs) forming a decoding candidate over which the DCI is detected within the two overlapping RB sets;
  - determine the CCEs are located within each of the two overlapping RB sets only when the CCEs are entirely contained within an overlap region comprising shared resource elements of the plurality of resource elements between each of the two overlapping RB sets, wherein the two overlapping RB sets are only partially overlapping such that each comprises respective resource elements of the plurality of resource elements outside of the overlap region; and
  - perform rate-matching around each of the two overlapping RB sets for the PDSCH when the CCEs are determined to be located within each of the two overlapping RB sets.

10. The scheduled entity of claim 9, wherein the processor is further configured to:
- receive the PDSCH within a first collection of RBs in the TTI outside of the two overlapping RB sets.

11. The scheduled entity of claim 9, wherein the processor is further configured to:
- determine a rate-matching mode associated with each of the two overlapping RB sets indicates that rate-matching is performed around at least one RB set of the two overlapping RB sets when the DCI scheduling the PDSCH is detected in the at least one RB set.

12. The scheduled entity of claim 11, wherein the processor is further configured to:
- receive a rate-matching mode parameter comprising the rate-matching mode parameter via radio resource control (RRC) signaling.

13. The scheduled entity of claim 12, wherein the processor is further configured to:
- receive the PDSCH within a second collection of RBs in the TTI outside of the first RB set and outside of the overlap region contained within the second RB set, wherein the second collection of RBs comprises a portion of the second RB set that is outside of the overlap region.

14. The scheduled entity of claim 9, wherein the processor is further configured to:
- determine the CCEs are located within a first RB set of the two overlapping RB sets when at least one of the CCEs is located within only the first RB set and remaining ones of the CCEs are located within the overlap region between each of the two overlapping RB sets; and
- perform rate-matching around the first RB set and the overlap region in a second RB set of the two overlapping RB sets for the PDSCH when the CCEs are determined to be located within the first RB set.

15. The scheduled entity of claim 9, wherein the PDCCH comprises a shortened PDCCH and the DCI comprises a shortened DCI.

16. A method of wireless communication at a scheduling entity, the method comprising:
- scheduling two overlapping resource block (RB) sets of a plurality of RB sets within a transmission time interval (TTI) for transmission of a physical downlink control channel (PDCCH) comprising downlink control information (DCI) to a scheduled entity, wherein each of the plurality of RB sets comprises a respective group of RBs, each of the RBs comprising a plurality of resource elements;
- scheduling control channel elements (CCEs) forming a decoding candidate over which the DCI is detected within the two overlapping RB sets;
- determining the CCEs are located within each of the two overlapping RB sets only when the CCEs are entirely contained within an overlap region comprising shared resource elements of the plurality of resource elements between each of the two overlapping RB sets, wherein the two overlapping RB sets are only partially overlapping such that each comprises respective resource elements of the plurality of resource elements outside of the overlap region;
- performing rate-matching around each of the two overlapping RB sets for a physical downlink shared channel (PDSCH) scheduled by the DCI when the CCEs are determined to be located within each of the two overlapping RB sets; and
- transmitting the PDCCH and the PDSCH to the scheduled entity within the TTI.

17. The method of claim 16, wherein transmitting the PDCCH and the PDSCH to the scheduled entity further comprises:
- scheduling the PDSCH within a first collection of RBs in the TTI outside of the two overlapping RB sets;
- transmitting the PDCCH over the CCEs in the TTI; and
- transmitting the PDSCH over the first collection of RBs in the TTI.

18. The method of claim 16, further comprising:
- configuring a rate-matching mode associated with each of the two overlapping RB sets, wherein the rate-matching mode indicates that rate-matching is performed around at least one RB set of the two overlapping RB sets when the DCI scheduling the PDSCH is detected in the at least one RB set.

19. The method of claim 18, further comprising:
- transmitting a rate-matching mode parameter comprising the rate-matching mode to the scheduled entity via radio resource control (RRC) signaling.

20. The method of claim 16, further comprising:
- determining the CCEs are located within a first RB set of the two overlapping RB sets when at least one of the CCEs is located within only the first RB set and remaining ones of the CCEs are located within the overlap region between each of the two overlapping RB sets; and
- performing rate-matching around the first RB set and the overlap region in a second RB set of the two overlapping RB sets for the PDSCH when the CCEs are determined to be located within the first RB set.

21. The method of claim 20, further comprising:
scheduling the PDSCH within a second collection of RBs in the TTI outside of the first RB set and outside of the overlap region contained within the second RB set, wherein the second collection of RBs comprises a portion of the second RB set outside of the overlap region; and
transmitting the PDSCH over the second collection of RBs in the TTI.

22. The method of claim 16, wherein the TTI comprises a shortened TTI (sTTI), the PDCCH comprises a shortened PDCCH (sPDCCH) and the DCI comprises a shortened DCI (sDCI).

23. The method of claim 22, wherein sTTI comprises no more than seven symbols.

24. A scheduling entity in a wireless communication network, comprising:
a transceiver for wireless communication with a scheduled entity;
a memory; and
a processor communicatively coupled to the transceiver and the memory, the processor configured to:
schedule two overlapping resource block (RB) sets of a plurality of RB sets within a transmission time interval (TTI) for transmission of a physical downlink control channel (PDCCH) comprising downlink control information (DCI) to the scheduled entity, wherein each of the plurality of RB sets comprises a respective group of RBs, each of the RBs comprising a plurality of resource elements;
schedule control channel elements (CCEs) forming a decoding candidate over which the DCI is detected within the two overlapping RB sets;
determine the CCEs are located within each of the two overlapping RB sets only when the CCEs are entirely contained within an overlap region comprising shared resource elements of the plurality of resource elements between each of the two overlapping RB sets, wherein the two overlapping RB sets are only partially overlapping such that each comprises respective resource elements of the plurality of resource elements outside of the overlap region;
perform rate-matching around each of the two overlapping RB sets for a physical downlink shared channel (PDSCH) scheduled by the DCI when the CCEs are determined to be located within each of the two overlapping RB sets; and
transmit the PDCCH and the PDSCH to the scheduled entity within the TTI via the transceiver.

25. The scheduling entity of claim 24, wherein the processor is further configured to:
schedule the PDSCH within a first collection of RBs in the TTI outside of the two overlapping RB sets;
transmit the PDCCH over the CCEs in the TTI; and
transmit the PDSCH over the first collection of RBs in the TTI.

26. The scheduling entity of claim 24, wherein the processor is further configured to:
configure a rate-matching mode associated with each of the two overlapping RB sets, wherein the rate-matching mode indicates that rate-matching is performed around at least one RB set of the two overlapping RB sets when the DCI scheduling the PDSCH is detected in the at least one RB set.

27. The scheduling entity of claim 26, wherein the processor is further configured to:
transmit a rate-matching mode parameter comprising the rate-matching mode to the scheduled entity via radio resource control (RRC) signaling.

28. The scheduling entity of claim 24, wherein the processor is further configured to:
determine the CCEs are located within a first RB set of the two overlapping RB sets when at least one of the CCEs is located within only the first RB set and remaining ones of the CCEs are located within the overlap region between each of the two overlapping RB sets; and
perform rate-matching around the first RB set and the overlap region in a second RB set of the two overlapping RB sets for the PDSCH when the CCEs are determined to be located within the first RB set.

29. The scheduling entity of claim 28, wherein the processor is further configured to:
schedule the PDSCH within a second collection of RBs in the TTI outside of the first RB set and outside of the overlap region contained within the second RB set, wherein the second collection of RBs comprises a portion of the second RB set outside of the overlap region; and
transmit the PDSCH over the second collection of RBs in the TTI.

30. The scheduling entity of claim 24, wherein the TTI comprises a shortened TTI (sTTI), the PDCCH comprises a shortened PDCCH (sPDCCH) and the DCI comprises a shortened DCI (sDCI).

* * * * *